(12) United States Patent
Kim et al.

(10) Patent No.: US 10,990,388 B2
(45) Date of Patent: *Apr. 27, 2021

(54) SEMICONDUCTOR DEVICE

(71) Applicant: SAMSUNG ELECTRONICS CO., LTD., Suwon-si (KR)

(72) Inventors: Hyun Pil Kim, Seoul (KR); Hyun Woo Sim, Seoul (KR); Seong Woo Ahn, Yongin-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,761

(22) Filed: Jul. 24, 2019

(65) Prior Publication Data

US 2019/0347096 A1    Nov. 14, 2019

Related U.S. Application Data

(60) Continuation of application No. 15/905,979, filed on Feb. 27, 2018, now Pat. No. 10,409,593, which is a division of application No. 15/717,989, filed on Sep. 28, 2017, now Pat. No. 10,649,771.

(30) Foreign Application Priority Data

Mar. 31, 2017   (KR) ........................ 10-2017-0042125

(51) Int. Cl.
G06F 9/30 (2018.01)
G06F 1/3287 (2019.01)
G06T 1/20 (2006.01)

(52) U.S. Cl.
CPC .......... *G06F 9/3001* (2013.01); *G06F 1/3287* (2013.01); *G06F 9/30101* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 6,139,498 A | 10/2000 | Katsman et al. |
| 6,388,671 B1 | 5/2002 | Yoshizawa |
| 6,901,422 B1 | 5/2005 | Sazegari |
| 7,162,573 B2 | 1/2007 | Mehta |
| 7,219,214 B2 | 5/2007 | Ford et al. |

(Continued)

FOREIGN PATENT DOCUMENTS

| | | | |
|---|---|---|---|
| CN | 105589336 A | 5/2016 |
| JP | 20010-14139 A | 1/2001 |

(Continued)

OTHER PUBLICATIONS

Korean Office Action dated Oct. 21, 2020, Cited in Related Korean Application No. KR10-2017-0042125.

*Primary Examiner* — Corey S Faherty

(74) *Attorney, Agent, or Firm* — Volentine, Whitt & Francos, PLLC

(57) ABSTRACT

A semiconductor device including a first processor having a first register, the first processor configured to perform region of interest (ROI) calculations using the first register; and a second processor having a second register, the second processor configured to perform arithmetic calculations using the second register. The first register is shared with the second processor, and the second register is shared with the first processor.

11 Claims, 23 Drawing Sheets

(56) References Cited

U.S. PATENT DOCUMENTS

| | | |
|---|---|---|
| 7,792,372 B2 | 9/2010 | Ryu |
| 7,873,812 B1 | 1/2011 | Mimar |
| 8,146,067 B2 | 3/2012 | Eichenberger et al. |
| 8,248,422 B2 | 8/2012 | Mejdrich et al. |
| 8,725,991 B2 | 5/2014 | Wang et al. |
| 9,405,538 B2 | 8/2016 | Ioffe et al. |
| 2002/0198911 A1 | 12/2002 | Blomgren et al. |
| 2007/0130445 A1 | 6/2007 | Lau et al. |
| 2008/0252747 A1 | 10/2008 | Silverbrook et al. |
| 2010/0095087 A1 | 4/2010 | Eichenberger et al. |
| 2012/0133660 A1 | 5/2012 | Jang et al. |
| 2014/0189292 A1 | 7/2014 | Ioffe et al. |
| 2014/0237214 A1 | 8/2014 | Lieske |
| 2015/0127924 A1 | 5/2015 | Prasad et al. |
| 2015/0310053 A1 | 10/2015 | Kim |
| 2016/0342418 A1 | 11/2016 | Ioffe et al. |
| 2017/0337156 A1 | 11/2017 | Yadavalli |

FOREIGN PATENT DOCUMENTS

| | | |
|---|---|---|
| JP | 2004-259143 | 9/2004 |
| JP | 2006-236715 A | 9/2006 |
| JP | 2012-128805 A | 7/2012 |
| JP | 2013-105217 A | 5/2013 |
| JP | 5445469 B2 | 3/2014 |
| JP | 2016-091488 A | 5/2016 |
| JP | 2016-112285 A | 6/2016 |
| KR | 1027906 B1 | 4/2011 |
| KR | 1079691 A | 11/2011 |
| KR | 1110550 A | 7/2012 |
| KR | 2014-0092135 A | 7/2014 |
| KR | 1482229 B1 | 1/2015 |
| KR | 2015-0101995 A | 9/2015 |
| KR | 1573618 B1 | 12/2015 |
| KR | 20160078025 A | 7/2016 |
| KR | 1662769 A | 10/2016 |
| KR | 1665207 B1 | 10/2016 |
| TW | 200813724 | 3/2008 |
| WO | WO2010/043401 A2 | 4/2010 |

| | | |
|---|---|---|
| OSR0 | ORh[0] | ORl[0] |
| | ORh[1] | ORl[1] |
| | ORh[2] | ORl[2] |
| | ORh[3] | ORl[3] |
| | ORh[4] | ORl[4] |
| | ORh[5] | ORl[5] |
| | ORh[6] | ORl[6] |
| | ORh[7] | ORl[7] |
| OSR1 | ORh[8] | ORl[8] |
| | ORh[9] | ORl[9] |
| | ORh[10] | ORl[10] |
| | ORh[11] | ORl[11] |
| | ORh[12] | ORl[12] |
| | ORh[13] | ORl[13] |
| | ORh[14] | ORl[14] |
| | ORh[15] | ORl[15] |
| | 1024 | 1024 |

FIG. 8A

|   | 1 | 2 | 3 | 4 | 5 | 6 | 7 | 8 | 9 | 10 | 11 |
|---|---|---|---|---|---|---|---|---|---|----|----|
| 1 | N11 | N12 | N13 | N21 | N31 | N41 | N51 | N71 | N91 | NA1 | NB1 |
| 2 | N14 | N15 | N16 | N22 | N32 | N42 | N52 | N72 | N92 | NA2 | NB2 |
| 3 | N17 | N18 | N19 | N23 | N33 | N43 | N53 | N73 | N93 | NA3 | NB3 |
| 4 | N24 | N25 | N26 | N27 | N34 | N44 | N54 | N74 | N94 | NA4 | NB4 |
| 5 | N28 | N29 | N35 | N36 | N37 | N45 | N55 | N75 | N95 | NA5 | NB5 |
| 6 | N38 | N39 | N46 | N47 | N48 | N49 | N56 | N76 | N96 | NA6 | NB6 |
| 7 | N57 | N58 | N59 | N61 | N62 | N63 | N64 | N77 | N97 | NA7 | NB7 |
| 8 | N65 | N66 | N67 | N68 | N69 | N78 | N79 | N81 | N98 | NA8 | NB8 |
| 9 | N82 | N83 | N84 | N85 | N86 | N87 | N88 | N89 | N99 | NA9 | NB9 |
| 10 | NC1 | NC2 | NC3 | NC4 | NC5 | NC6 | NC7 | NC8 | NC9 | NE1 | NE2 |
| 11 | ND1 | ND2 | ND3 | ND4 | ND5 | ND6 | ND7 | ND8 | ND9 | NE3 | NE4 |

| | 1 | 2 | 3 | 4 | 5 | 6 | 7 | 8 | 9 | 10 | 11 |
|---|---|---|---|---|---|---|---|---|---|---|---|
| 1 | N11 | N12 | N13 | N21 | N31 | N41 | N51 | N71 | N91 | NA1 | NB1 |
| 2 | N14 | N15 | N16 | N22 | N32 | N42 | N52 | N72 | N92 | NA2 | NB2 |
| 3 | N17 | N18 | N19 | N23 | N33 | N43 | N53 | N73 | N93 | NA3 | NB3 |
| 4 | N24 | N25 | N26 | N27 | N34 | N44 | N54 | N74 | N94 | NA4 | NB4 |
| 5 | N28 | N29 | N35 | N36 | N37 | N45 | N55 | N75 | N95 | NA5 | NB5 |
| 6 | N38 | N39 | N46 | N47 | N48 | N49 | N56 | N76 | N96 | NA6 | NB6 |
| 7 | N57 | N58 | N59 | N61 | N62 | N63 | N64 | N77 | N97 | NA7 | NB7 |
| 8 | N65 | N66 | N67 | N68 | N69 | N78 | N79 | N81 | N98 | NA8 | NB8 |
| 9 | N82 | N83 | N84 | N85 | N86 | N87 | N88 | N89 | N99 | NA9 | NB9 |
| 10 | NC1 | NC2 | NC3 | NC4 | NC5 | NC6 | NC7 | NC8 | NC9 | NE1 | NE2 |
| 11 | ND1 | ND2 | ND3 | ND4 | ND5 | ND6 | ND7 | ND8 | ND9 | NE3 | NE4 |

|   | 1 | 2 | 3 | 4 | 5 | 6 | 7 | 8 | 9 | 10 | 11 |
|---|---|---|---|---|---|---|---|---|---|----|----|
| 1 | N11 | N12 | N13 | N21 | N31 | N41 | N51 | N71 | N91 | NA1 | NB1 |
| 2 | N14 | N15 | N16 | N22 | N32 | N42 | N52 | N72 | N92 | NA2 | NB2 |
| 3 | N17 | N18 | N19 | N23 | N33 | N43 | N53 | N73 | N93 | NA3 | NB3 |
| 4 | N24 | N25 | N26 | N27 | N34 | N44 | N54 | N74 | N94 | NA4 | NB4 |
| 5 | N28 | N29 | N35 | N36 | N37 | N45 | N55 | N75 | N95 | NA5 | NB5 |
| 6 | N38 | N39 | N46 | N47 | N48 | N49 | N56 | N76 | N96 | NA6 | NB6 |
| 7 | N57 | N58 | N59 | N61 | N62 | N63 | N64 | N77 | N97 | NA7 | NB7 |
| 8 | N65 | N66 | N67 | N68 | N69 | N78 | N79 | N81 | N98 | NA8 | NB8 |
| 9 | N82 | N83 | N84 | N85 | N86 | N87 | N88 | N89 | N99 | NA9 | NB9 |
| 10 | NC1 | NC2 | NC3 | NC4 | NC5 | NC6 | NC7 | NC8 | NC9 | NE1 | NE2 |
| 11 | ND1 | ND2 | ND3 | ND4 | ND5 | ND6 | ND7 | ND8 | ND9 | NE3 | NE4 |

M31 (columns 2–3), M32 (columns 4–5)

FIG. 8H

| | 1 | 2 | 3 | 4 | 5 | 6 | 7 | 8 | 9 | 10 | 11 |
|---|---|---|---|---|---|---|---|---|---|---|---|
| 1 | N11 | N12 | N13 | N21 | N31 | N41 | N51 | N71 | N91 | NA1 | NB1 |
| 2 | N14 | N15 | N16 | N22 | N32 | N42 | N52 | N72 | N92 | NA2 | NB2 |
| 3 | N17 | N18 | N19 | N23 | N33 | N43 | N53 | N73 | N93 | NA3 | NB3 |
| 4 | N24 | N25 | N26 | N27 | N34 | N44 | N54 | N74 | N94 | NA4 | NB4 |
| 5 | N28 | N29 | N35 | N36 | N37 | N45 | N55 | N75 | N95 | NA5 | NB5 |
| 6 | N38 | N39 | N46 | N47 | N48 | N49 | N56 | N76 | N96 | NA6 | NB6 |
| 7 | N57 | N58 | N59 | N61 | N62 | N63 | N64 | N77 | N97 | NA7 | NB7 |
| 8 | N65 | N66 | N67 | N68 | N69 | N78 | N79 | N81 | N98 | NA8 | NB8 |
| 9 | N82 | N83 | N84 | N85 | N86 | N87 | N88 | N89 | N99 | NA9 | NB9 |
| 10 | NC1 | NC2 | NC3 | NC4 | NC5 | NC6 | NC7 | NC8 | NC9 | NE1 | NE2 |
| 11 | ND1 | ND2 | ND3 | ND4 | ND5 | ND6 | ND7 | ND8 | ND9 | NE3 | NE4 |

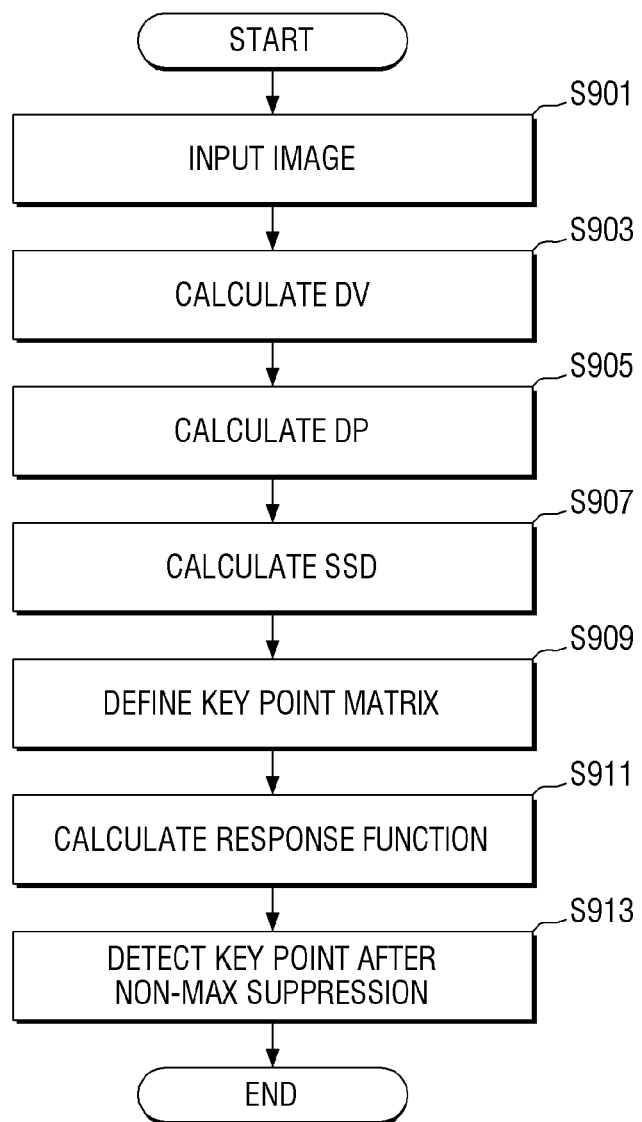

FIG. 10

| Stage | Target Register | Operand1 | Operand2 | Opcode | Options |
|---|---|---|---|---|---|
| MAP | OR | IDA | CDA | Add, Sub, Abs, AbsDiff, Cmp, Mul, Sqr | 8/16b sign |
| REDUCE | OR/VR | | | Add/Min/Max Tree | |
| MAP_REDUCE | OR/VR | | | Combination of MAP & REDUCE operations | |

FIG. 11A

```
inline assembly v16int_t* chess_storage(r10) conv_5x5_b(v16int_t* chess_storage(r10) addr, v16int_t*
        chess_storage(r11) start_addr, v16int_t chess_storage(v10) vzero)
  property(loop_free functional) clobbers()
{
  asm begin
                                    OR[ 0]=MAPMul_ReduceAcc16(IDA_Conv3(IR),CDA_Conv3(CR,w16)): ShUpReg=1
    IR[4]=VM[(r10),128] #vc0 : OR[ 0]=MAPMul_ReduceAcc16(IDA_Conv4(IR),CDA_Conv4(CR,w16))
                                    OR[ 0]=MAPMul_ReduceAcc16(IDA_Conv5(IR),CDA_Conv5(CR,w16))
                                    OR[ 1]=MAPMul_ReduceAcc16(IDA_Conv3(IR),CDA_Conv3(CR,w16))
    IR[4]=VM[(r10),128] #vc0 : OR[ 1]=MAPMul_ReduceAcc16(IDA_Conv4(IR),CDA_Conv4(CR,w16))
                                    OR[ 1]=MAPMul_ReduceAcc16(IDA_Conv5(IR),CDA_Conv5(CR,w16))
                                    OR[ 2]=MAPMul_ReduceAcc16(IDA_Conv3(IR),CDA_Conv3(CR,w16))
    IR[4]=VM[(r10),128] #vc0 : OR[ 2]=MAPMul_ReduceAcc16(IDA_Conv4(IR),CDA_Conv4(CR,w16))
                                    OR[ 2]=MAPMul_ReduceAcc16(IDA_Conv5(IR),CDA_Conv5(CR,w16))
                                    OR[ 3]=MAPMul_ReduceAcc16(IDA_Conv3(IR),CDA_Conv3(CR,w16))
    IR[4]=VM[(r10),128] #vc0 : OR[ 3]=MAPMul_ReduceAcc16(IDA_Conv4(IR),CDA_Conv4(CR,w16))
                                    OR[ 3]=MAPMul_ReduceAcc16(IDA_Conv5(IR),CDA_Conv5(CR,w16))
                                    OR[ 4]=MAPMul_ReduceAcc16(IDA_Conv3(IR),CDA_Conv3(CR,w16))
    IR[4]=VM[(r10),128] #vc0 : OR[ 4]=MAPMul_ReduceAcc16(IDA_Conv4(IR),CDA_Conv4(CR,w16))
                                    OR[ 4]=MAPMul_ReduceAcc16(IDA_Conv5(IR),CDA_Conv5(CR,w16))
                                    OR[ 5]=MAPMul_ReduceAcc16(IDA_Conv3(IR),CDA_Conv3(CR,w16))
    IR[4]=VM[(r10),128] #vc0 : OR[ 5]=MAPMul_ReduceAcc16(IDA_Conv4(IR),CDA_Conv4(CR,w16))
                                    OR[ 5]=MAPMul_ReduceAcc16(IDA_Conv5(IR),CDA_Conv5(CR,w16))
                                    OR[ 6]=MAPMul_ReduceAcc16(IDA_Conv3(IR),CDA_Conv3(CR,w16))
    IR[4]=VM[(r10),128] #vc0 : OR[ 6]=MAPMul_ReduceAcc16(IDA_Conv4(IR),CDA_Conv4(CR,w16))
                                    OR[ 6]=MAPMul_ReduceAcc16(IDA_Conv5(IR),CDA_Conv5(CR,w16))
                                    OR[ 7]=MAPMul_ReduceAcc16(IDA_Conv3(IR),CDA_Conv3(CR,w16))
    IR[4]=VM[(r10),128] #vc0 : OR[ 7]=MAPMul_ReduceAcc16(IDA_Conv4(IR),CDA_Conv4(CR,w16))
                                    OR[ 7]=MAPMul_ReduceAcc16(IDA_Conv5(IR),CDA_Conv5(CR,w16))
                                    OR[ 8]=MAPMul_ReduceAcc16(IDA_Conv3(IR),CDA_Conv3(CR,w16))
                                    OR[ 8]=MAPMul_ReduceAcc16(IDA_Conv4(IR),CDA_Conv4(CR,w16))
    IR[4]=v10                  : OR[ 8]=MAPMul_ReduceAcc16(IDA_Conv5(IR),CDA_Conv5(CR,w16))
                                    OR[ 9]=MAPMul_ReduceAcc16(IDA_Conv3(IR),CDA_Conv3(CR,w16))
                                    OR[ 9]=MAPMul_ReduceAcc16(IDA_Conv4(IR),CDA_Conv4(CR,w16))
    IR[4]=v10                  : OR[ 9]=MAPMul_ReduceAcc16(IDA_Conv5(IR),CDA_Conv5(CR,w16)): ShUpReg=0
                                    OR[10]=MAPMul_ReduceAcc16(IDA_Conv3(IR),CDA_Conv3(CR,w16)): r10=r11
    IR[4]=VM[(r10),128] #vc0 : OR[10]=MAPMul_ReduceAcc16(IDA_Conv4(IR),CDA_Conv4(CR,w16))
    IR[1]=VM[(r10),128] #vc0 : OR[10]=MAPMul_ReduceAcc16(IDA_Conv5(IR),CDA_Conv5(CR,w16))
  asm_end
}
```

FIG. 11B

|   | 1 | 2 | 3 | 4 | 5 | 6 | 7 | 8 | 9 | 10 | 11 |
|---|---|---|---|---|---|---|---|---|---|----|----|
| 1 | N11 | N12 | N13 | N21 | N31 | N41 | N51 | N71 | N91 | NA1 | NB1 |
| 2 | N14 | N15 | N16 | N22 | N32 | N42 | N52 | N72 | N92 | NA2 | NB2 |
| 3 | N17 | N18 | N19 | N23 | N33 | N43 | N53 | N73 | N93 | NA3 | NB3 |
| 4 | N24 | N25 | N26 | N27 | N34 | N44 | N54 | N74 | N94 | NA4 | NB4 |
| 5 | N28 | N29 | N35 | N36 | N37 | N45 | N55 | N75 | N95 | NA5 | NB5 |
| 6 | N38 | N39 | N46 | N47 | N48 | N49 | N56 | N76 | N96 | NA6 | NB6 |
| 7 | N57 | N58 | N59 | N61 | N62 | N63 | N64 | N77 | N97 | NA7 | NB7 |
| 8 | N65 | N66 | N67 | N68 | N69 | N78 | N79 | N81 | N98 | NA8 | NB8 |
| 9 | N82 | N83 | N84 | N85 | N86 | N87 | N88 | N89 | N99 | NA9 | NB9 |
| 10 | NC1 | NC2 | NC3 | NC4 | NC5 | NC6 | NC7 | NC8 | NC9 | NE1 | NE2 |
| 11 | ND1 | ND2 | ND3 | ND4 | ND5 | ND6 | ND7 | ND8 | ND9 | NE3 | NE4 |

SEMICONDUCTOR DEVICE

CROSS-REFERENCE TO RELATED APPLICATION

This is a Continuation of U.S. application Ser. No. 15/905,979, filed Feb. 27, 2018, which issued as U.S. Pat. No. 10,409,593 on Sep. 10, 2019, and which is a Divisional of U.S. application Ser. No. 15/717,989, filed Sep. 28, 2017, which issued as U.S. Pat. No. 10,649,771 on May 12, 2020, and in which a claim for priority under 35 U.S.C. § 119 is made to Korean Patent Application No. 10-2017-0041748 filed on Mar. 31, 2017 in the Korean Intellectual Property Office, the entire contents of which are hereby incorporated by reference.

BACKGROUND

The present inventive concepts herein relate to a semiconductor device, and more particularly to a semiconductor device that is performs image processing, vision processing and neural network processing on image data.

Applications related to image processing, vision processing and neural network processing may be implemented for example on or as part of a system including instructions and memory structures specialized for matrix calculation. However, although applications related to image processing, vision processing and neural network processing may use similar methods of calculation, systems which carry out such processing in many cases include multiple processors that are isolated and implemented for independently carrying out the image processing, the vision processing and the neural network processing. This is because, despite the functional similarity among the applications related to image processing, vision processing, and neural network processing, details such as data processing rate, memory bandwidth, synchronization, among other things that are necessary for the respective applications are different. It is difficult to implement a single processor that is capable of integrated image processing, vision processing and neural network processing. Accordingly, for systems in which each of image processing, vision processing and neural network processing are required, there is a need to provide an integrated processing environment and method that can satisfy the respective requirements of the applications.

SUMMARY

Embodiments of the inventive concepts provide a semiconductor device which is capable of providing an integrated processing environment enabling efficient control and increased data utilization for image processing, vision processing and neural network processing.

Embodiments of the inventive concept provide a semiconductor device including a first processor having a first register, the first processor configured to perform region of interest (ROI) calculations using the first register; and a second processor having a second register, the second processor configured to perform arithmetic calculations using the second register. The first register is shared with the second processor, and the second register is shared by the first processor.

Embodiments of the inventive concepts provide a semiconductor device including a first processor having a first register, the first processor configured to perform region of interest (ROI) calculations using the first register; and a second processor having a second register, the second processor configured to perform arithmetic calculations using the second register. The first processor and the second processor share a same instruction set architecture (ISA).

Embodiments of the inventive concepts provide a semiconductor device including a load store unit configured to transmit image data to a memory device and to receive image data from the memory device; an internal register configured to store the received image data provided from the load store unit; a data arrange layer configured to rearrange the stored image data from the internal register into N number of data rows, wherein the data rows each have a plurality of lanes; and a plurality of arithmetic logic units (ALUs) having N number of ALU groups. The N number of ALU groups respectively configured to process the rearranged image data of the N number of data rows.

Embodiments of the inventive concepts provide a semiconductor device including a first processor having a first register, the first processor configured to perform region of interest (ROI) calculations using the first register; and a second processor having a second register, the second processor configured to perform arithmetic calculations using the second register. The first processor includes a data arrange layer configured to rearrange image data from the first register into N number of data rows, wherein the N number of data rows each have a plurality of lanes; and a plurality of arithmetic logic units (ALUs) having N number of ALU groups, the N number of ALU groups respectively configured to process the rearranged image data of the N number of data rows. The first register is shared with the second processor, and the second register is shared with the first processor.

Embodiments of the inventive concept provide a region of interest (ROI) calculation method of a semiconductor device. The semiconductor device includes an internal register configured to store image data, a data arrange layer configured to rearrange the stored image data into N number of data rows each having a plurality of lanes, and a plurality of arithmetic logic units (ALUs) having N ALU groups configured to process the N number of data rows. The method includes rearranging, by the data arrange layer, first data of the stored image data to provide rearranged first image data, the first data having n×n matrix size wherein n is a natural number; performing, by the ALUs, a first map calculation using the rearranged first image data to generate first output data; rearranging, by the data rearrange layer, third data of the stored image data to provide rearranged second image data, the third data and the first data included as parts of second data of the stored image data, the second data having (n+1)×(n+1) matrix size, and the third data not belonging to the first data; performing, by the ALUs, a second map calculation using the rearranged second image data to generate second output data; and performing, by the ALUs, a reduce calculation using the first and second output data to generate final image data.

BRIEF DESCRIPTION OF THE DRAWINGS

The above and other objects, features and advantages of the inventive concepts will become more apparent to those of ordinary skill in the art by describing in detail exemplary embodiments thereof with reference to the accompanying drawings.

FIGS. 5A, 5B, 5C and 5D illustrate schematic views explanatory of the structure of registers of a semiconductor device according to an embodiment of the inventive concepts.

FIG. 8A illustrates a schematic view explanatory of data patterns for region of interest (ROI) calculation of matrices of varying sizes.

FIGS. 8B and 8C illustrate schematic views explanatory of data patterns for ROI calculation according to an embodiment of the inventive concepts.

FIGS. 8D, 8E, 8F and 8G illustrate schematic views explanatory of data patterns for ROI calculation according to another embodiment of the inventive concepts.

FIG. 8H illustrates a schematic view explanatory of a shiftup calculation of a semiconductor device according to an embodiment of the inventive concepts.

FIG. 9 illustrates a flowchart explanatory of an exemplary operation in which Harris corner detection is performed using a semiconductor device according to various embodiments of the inventive concepts.

FIG. 10 illustrates a view explanatory of an implementation of instructions for efficiently processing matrix calculations used in an application associated with vision processing and neural network processing, supported by a semiconductor device according to an embodiment of the inventive concepts.

FIGS. 11A and 11B illustrate views explanatory of an example of actual assembly instructions for convolution calculation of a 5×5 matrix in FIG. 8D.

DETAILED DESCRIPTION OF EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
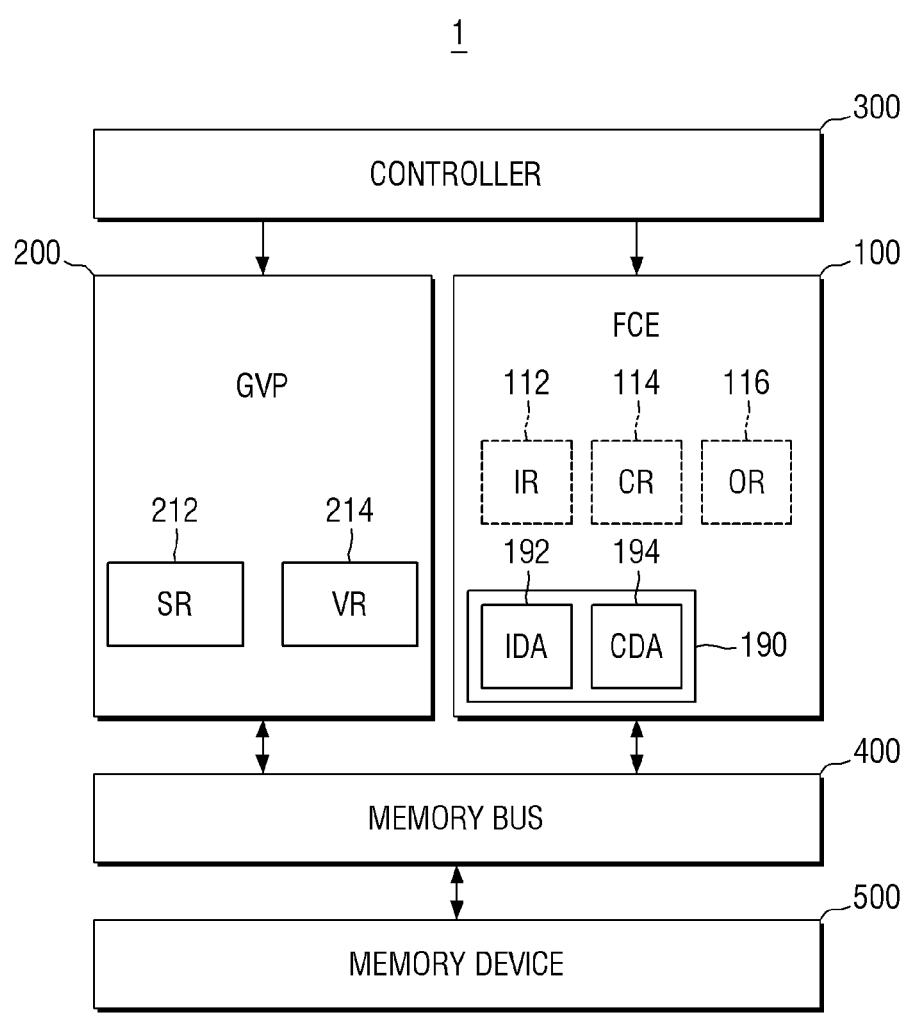
FIG. 1 illustrates a schematic view explanatory of a semiconductor device according to an embodiment of the inventive concepts.

FIG. 1 illustrates a schematic view explanatory of a semiconductor device according to an embodiment of the inventive concepts. Referring to FIG. 1, the semiconductor device 1 includes a first processor 100, a second processor 200, a controller 300 and a memory bus 400. Controller 300 controls overall operation of the first processor 100, the second processor 200 and the memory bus 400. The memory bus 400 may be connected to a memory device 500. In some embodiments the memory device 500 may be disposed separately of the semiconductor device 1 including the controller 300, the first processor 100, the second processor 200 and the memory bus 400. In other embodiments the memory device 500 may be disposed as part of the semiconductor device 1.

The first processor 100 may be a processor specialized for region of interest (ROI) calculations mainly used in image processing, vision processing and neural network processing. For example, the first processor 100 may perform one-dimensional filter calculations, two-dimensional filter calculations, census transform calculations, min/max filter calculations, sum of absolute difference (SAD) calculations, sum of squared difference (SSD) calculations, non maximum suppression (NMS) calculations, matrix multiplication calculations or the like.

The first processor 100 may include first registers 112, 114 and 116, and may perform ROI calculations using the first registers 112, 114 and 116. In some exemplary embodiments, the first registers may include at least one of an image register (IR) 112, a coefficient register (CR) 114, and an output register (OR) 116.

For example, the IR 112 may store image data inputted for processing at the first processor 100, and the CR 114 may store a coefficient of a filter for calculation on the image data. Further, the OR 116 may store a result of calculating performed on the image data after processing at the first processor 100.

The first processor 100 may further include data arrange module (DA) 190 which generates data patterns for processing at the first processor 100. The data arrange module 190 may generate data patterns for efficient performance of the ROI calculations with respect to various sizes of matrices.

Specifically, in some exemplary embodiments, the data arrange module 190 may include an image data arranger (IDA) 192 which generates data patterns for efficient ROI calculations at the first processor 100, by arranging the image data inputted for processing at the first processor 100 and stored in the IR 112, for example. Further, the data arrange module 190 may include a coefficient data arranger (CDA) 194 which generates data patterns for efficient ROI calculations at the first processor 100, by arranging the coefficient data of a filter stored in the CR 114 for calculation on the image data, for example. Specific explanation with respect to the data patterns generated by the data arrange module 190 will be described below with reference to FIGS. 6 to 8E. The first processor 100 may be a flexible convolution engine (FCE) unit.

The second processor 200 is a universal processor adapted for performing arithmetic calculations. In some exemplary embodiments, the second processor 200 may be implemented as a vector processor specialized for vector calculation processing including for example vector specialized instructions such as prediction calculations, vector permute calculations, vector bit manipulation calculations, butterfly calculations, sorting calculations, or the like. In some exemplary embodiments, the second processor 200 may adopt the structure of a single instruction multiple data (SIMD) architecture or a multi-slot very long instruction word (multi-slot VLIW) architecture.

The second processor 200 may include second registers 212 and 214, and may perform arithmetic calculations using the second registers 212 and 214. In some exemplary embodiments, the second registers may include at least one of a scalar register (SR) 212 and a vector register (VR) 214.

For example, the SR 212 may be a register used in the scalar calculations of the second processor 200, and the VR 214 may be a register used in the vector calculations of the second processor 200.

In some exemplary embodiments, the first processor 100 and the second processor 200 may share the same instruction set architecture (ISA). Accordingly, the first processor 100 specialized for ROI calculations and the second processor 200 specialized for arithmetic calculations may be shared at the instruction level, thus facilitating control of the first processor 100 and the second processor 200.

Meanwhile, in some exemplary embodiments, the first processor 100 and the second processor 200 may share registers. That is, the first registers 112, 114 and 116 of the first processor 100 may be shared with (i.e., used by) the second processor 200, and the second registers 212 and 214 of the second processor 200 may be shared with (i.e., used by) the first processor 100. Accordingly, the first processor 100 specialized for the ROI calculations and the second processor 200 specialized for the arithmetic calculations may share respective internal registers, which may in turn increase data utilization and decrease the number of accesses to memory.

In some exemplary embodiments, the first processor 100 and the second processor 200 may be implemented such that they are driven by separate or respective independent power supplies. Accordingly, power may be cut off to either of the first processor 100 and the second processor 200 not being used depending on specific operating situations.

Figure 2:
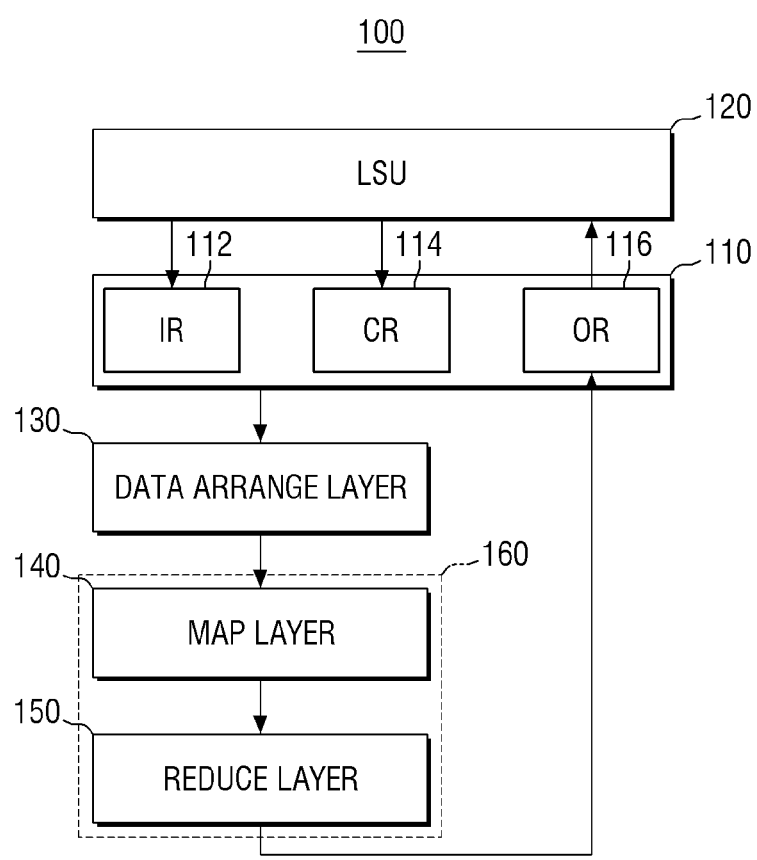
FIG. 2 illustrates a schematic view explanatory of a first processor of a semiconductor device according to an embodiment of the inventive concepts.

FIG. 2 illustrates a schematic view explanatory of a first processor of a semiconductor device according to an embodiment of the inventive concepts. Referring to FIG. 2, the first processor 100 of the semiconductor device 1 (shown in FIG. 1) includes an internal register 110, a load store unit (LSU) 120, a data arrange layer 130, a map layer 140 and a reduce layer 150.

The internal register 110 includes the IR 112, the CR 114, and the OR 116 described above with reference to FIG. 1.

The load store unit 120 may transmit and receive data to and from a memory device (such as memory device 500 shown in FIG. 1). For example, the load store unit 120 may read the data stored in the memory device (not shown) through a memory bus 400 such as shown in FIG. 1. The load store unit 120 and the memory bus 400 may correspond to a memory hierarchy 105 to be described below with reference to FIG. 4.

In some exemplary embodiments, the load store unit 120 may simultaneously read 1024 bits of data. Meanwhile, in some exemplary embodiments, the load store unit 120 may simultaneously read 1024×n bits of data by supporting n number of ports (n is 2, 4, 8, and so on, for example). Because the load store unit 120 may simultaneously read data on a 1024 bit basis, the data arrange layer 130 to be described below may rearrange the data in an arrangement form in which one line is composed of 1024 bits according to single instruction multiple data (SIMD) architecture.

The data arrange layer 130 may correspond to an element illustrated as the data arrange module 190 in FIG. 1, and may rearrange the data for processing at the first processor 100. Specifically, the data arrange layer 130 may generate data patterns for efficiently performing the ROI calculations with respect to various sizes of data (e.g., matrices) to be processed by the first processor 100. According to a type of the data generated as the data pattern, the data arrange layer 130 may include sub-units respectively corresponding to elements illustrated as the IDA 192 and the CDA 194 in FIG. 1.

Specifically, the data arrange layer 130 may rearrange the data for processing at the first processor 100 in a form of a plurality of data rows each including a plurality of data according to SIMD architecture. For example, the data arrange layer 130 may rearrange image data in a form of a plurality of data rows each including a plurality of data according to SIMD architecture so that the first processor 100 efficiently performs the ROI calculations, while also rearranging coefficient data of a filter for calculation on the image data in a form of a plurality of data rows each including a plurality of data according to SIMD architecture.

Although only a single arithmetic logic unit (ALU) 160 is shown in FIG. 2, the first processor 100 may include a plurality of arithmetic logic units (ALUs) 160 which are arranged in parallel with respect to each other so as to correspond to each of a plurality of data rows. Each of the plurality of ALUs 160 may include a map layer 140 and a reduce layer 150. The ALUs 160 may perform map calculations, reduce calculations or the like so as to process the data stored in each of a plurality of data rows in parallel using the map layer 140 and the reduce layer 150.

By employing the structure of rearranging the data, efficient processing may be performed especially with respect to 3×3, 4×4, 5×5, 7×7, 8×8, 9×9, 11×11 matrices for example, which are often used in image processing, vision processing, and neural network processing. Specific explanation will be described below with reference to FIGS. 4, 6 and 7.

Figure 3:
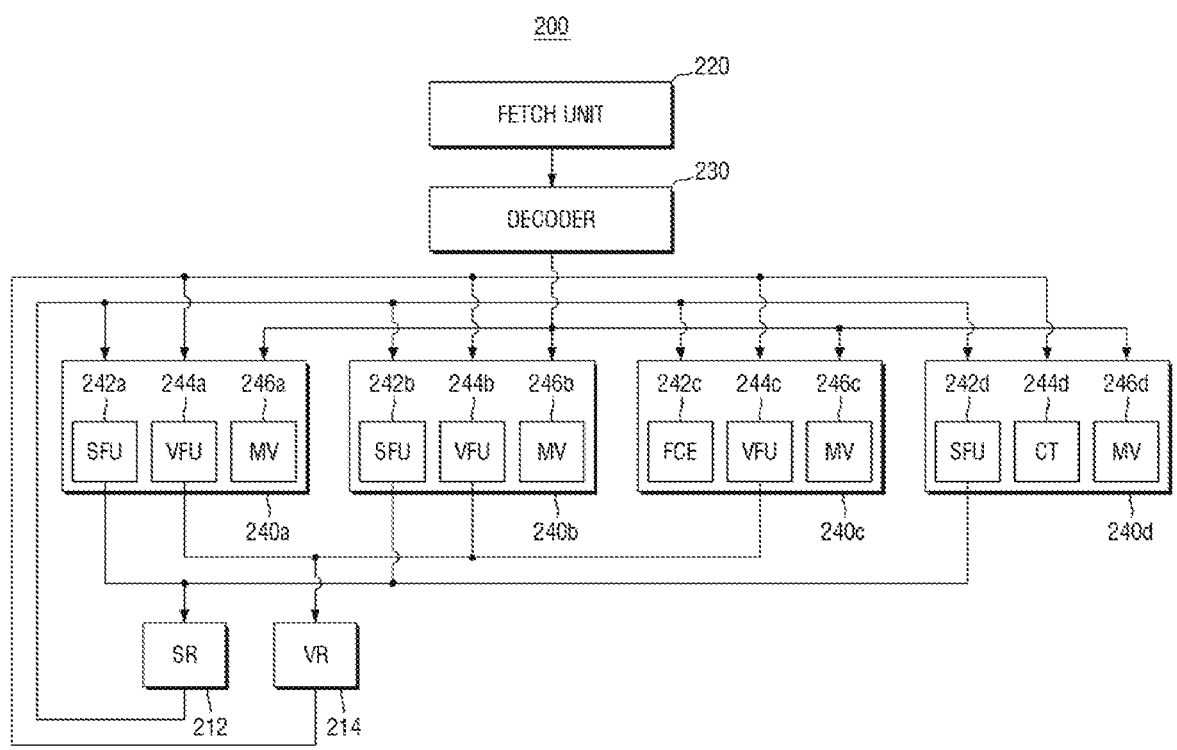
FIG. 3 illustrates a view explanatory of a second processor of a semiconductor device according to an embodiment of the inventive concepts.

FIG. 3 illustrates a view explanatory of a second processor of a semiconductor device according to an embodiment of the inventive concepts. Referring to FIG. 3, the second processor 200 of semiconductor device 1 (shown in FIG. 1) includes a fetch unit 220 and a decoder 230.

The decoder 230 may decode instructions provided from the fetch unit 220. In some exemplary embodiments, the instructions may be processed by four slots 240a, 240b, 240c and 240d according to the VLIW architecture, whereby the fetch unit 220 provides VLIW instructions to the decoder 230. For example, when the instruction fetched by the fetch unit 220 is 128 bits, the decoder 230 may decode the fetched instruction into four instructions each being composed of 32 bits, and the four instructions may be respectively processed by the slots 240a, 240b, 240c and 240d. That is, the fetch unit 220 may be configured to provide VLIW instructions to the decoder 230, and the decoder 230 may be configured to decode the VLIW instructions into a plurality of instructions.

Although the embodiment illustrates that the fetched instruction is decoded into four instructions and processed by the four slots for convenience of explanation, the second processor 200 is not limited to processing at four slots. For example, the instructions may be implemented for processing at any number slots not less than 2.

In some exemplary embodiments, the four slots 240a, 240b, 240c, 240d may simultaneously perform all the instructions except for a control instruction performed at control unit (CT) 244d. For efficiency of such parallel-processing, there may be arranged scalar functional units (SFU) 242a, 242b and 242d, vector functional units (VFU) 244a, 244b and 244c, and move units (MV) 246a, 246b, 246c and 246d, in the four slots 240a, 240b, 240c and 240d.

Specifically, the first slot 240a may include the SFU 242a, the VFU 244a and the MV 246a, and the second slot 240b may include the SFU 242b, the VFU 244b and the MV 246b. The third slot 240c may include a flexible convolution engine (FCE) unit 242c, the VFU 244c, and the MV 246c, which correspond to processing of instructions using the first processor 100. The fourth slot 240d may include the SFU 242d, control unit (CT) 244d corresponding to a control instruction, and the MV 246d.

In this example, the FCE unit 242c of the third slot 240c may correspond to the first processor 100. Further, the slots other than the third slot 240c, i.e., the first slot 240a, the second slot 240b and the fourth slot 240d may correspond to the second processor 200. For example, the instruction arranged in the FCE unit 242c of the third slot 240c may be executed by the first processor 100 and the instruction arranged in the fourth slot 240d may be executed by the second processor 200.

Further, the first processor 100 and the second processor 200 may share each other's data using the MVs 246a, 246b, 246c and 246d included in each of the slots 240a, 240b, 240c and 240d. Accordingly, work that may have been intended to be processed by the second processor 200 may instead be processed by the first processor 100 via the FCE unit 242c of the slot 240c, if needed. Further, in this case, data may have been intended to be processed by the second processor 200 may be also shared with the first processor 100.

A result of processing by the SFUs 242a, 242b and 242d may be stored in the SR 212 as described with respect to FIG. 1, and a result of processing by the VFUs 244a, 244b and 244c may be stored in the VR 214 as also described with respect to FIG. 1. Of course, the results stored in the SR 212 and the VR 214 may be used by at least one of the first processor 100 and the second processor 200 according to need.

It should be understood that the configuration illustrated in FIG. 3 is merely one of various embodiments of the inventive concepts presented for convenient explanation, and the second processor 200 should not be limited to the embodiment as shown in FIG. 2.

Figure 4:
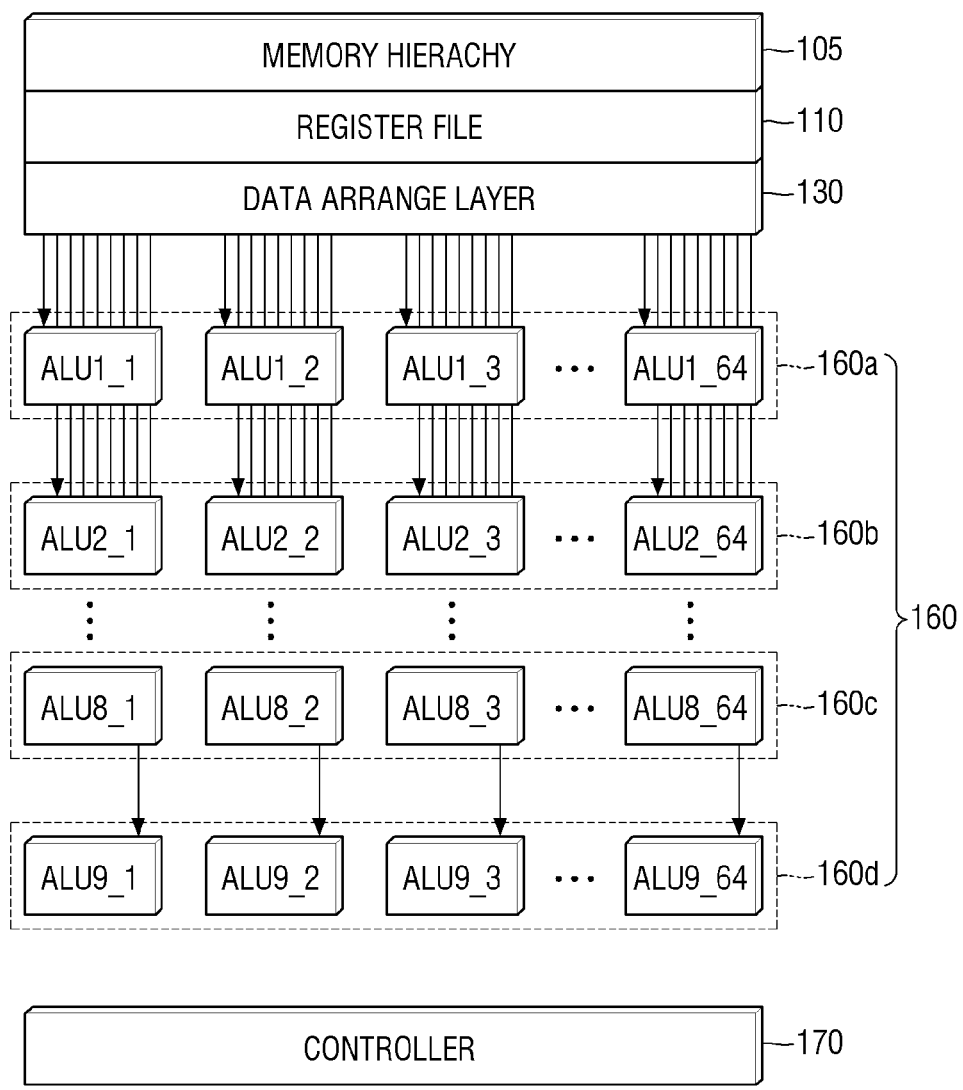
FIG. 4 illustrates a schematic view explanatory of architecture of a semiconductor device according to an embodiment of the inventive concepts.

FIG. 4 illustrates a schematic view explanatory of architecture of a semiconductor device according to an embodiment of the inventive concepts. Referring to FIG. 4, the architecture of the semiconductor device according to an embodiment of the inventive concepts may include a memory hierarchy 105, a register file 110, a data arrange layer 130, a plurality of ALUs 160 and a controller 170 for controlling overall operation of these elements.

For example, the memory hierarchy 105 may provide (or include) a memory interface, a memory device (such as memory device 500 shown in FIG. 1), the memory bus 400, the load store unit 120 or the like, which are described above with reference to FIGS. 1 and 2.

The register file 110 may correspond to the internal register 110 including the IR 112, the CR 114, and the OR 116 which are described above with reference to FIG. 2.

Further, the register file 110 may include an exemplary structure to be described below with reference to FIGS. 5A to 5D.

The data arrange layer 130 may correspond to the data arrange layer 130 described above with reference to FIG. 2, and may generate data patterns for efficient performance of ROI calculations of various sizes of data (e.g., matrices) for processing at the first processor 100.

A plurality of ALUs 160 may correspond to a plurality of ALUs 160 described above with reference to FIG. 2, may include the map layer 140 and the reduce layer 150, and may perform the map calculation, the reduce calculation or the like.

The architecture of FIG. 4 enables accurate flow control and complicated arithmetic calculations using the register file 110 that can be shared with a plurality of ALUs 160, while also enabling patternizing of the data stored in the register file 110 using the data arrange layer 130, thus enhancing reutilization of the input data.

For example, the data arrange layer 130 may generate data patterns so that the data for processing (specifically data for the ROI calculations) can be processed by a plurality of ALUs belonging to a first ALU group 160a, a second ALU group 160b, . . . , an eighth ALU group 160c and a ninth ALU group 160d, respectively. The ALU groups 160a, 160b, 160c and 160d are illustrated as each including for example 64 ALUs, although in other embodiments of the inventive concept the ALU groups may include any other appropriate number of ALUs. Generating data patterns suitable for processing by the nine ALU groups 160a, 160b, 160c and 160d will be specifically described below with reference to FIGS. 6 to 8E.

FIGS. 5A, 5B, 5C and 5D illustrate schematic views explanatory of the structure of registers of a semiconductor device according to an embodiment of the inventive concepts.

Figure 5A:
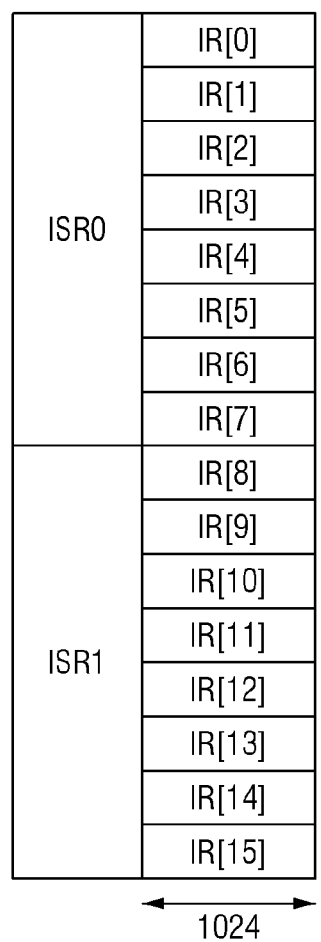

Referring to FIG. 5A, the image register (IR) 112 of the semiconductor device 1 shown in FIG. 1 is provided to store input image data particularly for processing of the ROI calculations at the first processor 100. It should be understood that IR 112 in this embodiment is characterized as an image register 'IR' because it is used to store input image data, but in other embodiments IR 112 may be named differently, depending on a specific implementation.

According to an embodiment of the inventive concepts, the IR 112 may be implemented to include 16 entries, for example. Further, the size of each of the entries IR[i] (where, i is an integer having a value of 0 to 15) may be implemented as 1024 bits, for example.

Among the entries, the entries IR[0] to IR[7] may be defined and used as the register file ISR0 for supporting the image data size for various ROI calculations. Likewise, the entries IR[8] to IR[15] may be defined and used as the register file ISR1 for supporting the image data size for various ROI calculations.

However, it should be understood that the definitions of the register file ISR0 and the register file ISR1 are not limited as described with respect to FIG. 5A, but they may be grouped and defined variably according to the size of processed data. That is, the register file ISR0 and the register file ISR1 may be defined to have different structure from that illustrated in FIG. 5A, in consideration of for example image data size, matrix calculation features, filter calculation features, or the like.

Figure 5B:
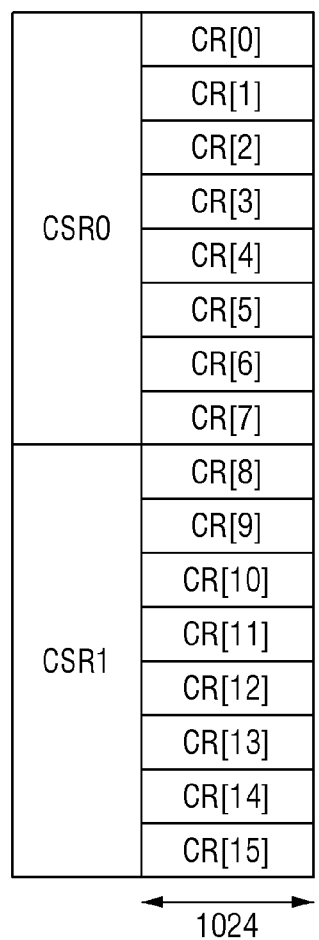

Next, referring to FIG. 5B, the coefficient register (CR) 114 of the semiconductor device 1 shown in FIG. 1 is provided to store coefficients of a filter for calculation on the image data stored in the IR 112. It should be understood that CR 114 in this embodiment is characterized as a coefficient register 'CR' because it is used to store coefficients, but in other embodiments CR 114 may be named differently depending on a specific implementation.

According to an embodiment of the inventive concepts, the CR 114 may be implemented to include 16 entries, for example. Further, the size of each of the entries CR[i] (where, i is an integer having a value of 0 to 15) may be implemented as 1024 bits, for example.

Among the entries, the entries CR[0] to CR[7] may be defined and used as the register file CSR0 for supporting image data size for various ROI calculations, as in the case of the IR 112. Likewise, the entries CR[8] to CR[15] may be defined and used as the register file CSR1 for supporting the image data size for various ROI calculations.

However, it should be understood that the definitions of the register file CSR0 and the register file CSR1 are not limited as described with respect to FIG. 5B, but they may be grouped and defined variably according to size of processed data. That is, the register file CSR0 and the register file CSR1 may be defined to have different structure from that illustrated in FIG. 5B, in consideration of for example image data size, matrix calculation features, filter calculation features, or the like.

Next, referring to FIG. 5C, the output register (OR) 116 of the semiconductor device 1 shown in FIG. 1 is provided to store a result of calculation from the processing of the image data at the first processor 100. It should be understood that OR 116 in this embodiment is characterized as an output register 'OR' because it is used to store a result of calculations, but in other embodiments OR 116 may be named differently depending on a specific implementation.

According to an embodiment of the inventive concepts, the OR 116 may be implemented to include 16 entries, for example. The entries of OR 116 may include corresponding parts ORh[i] and ORh[i] as shown in FIG. 5C. The entries including the corresponding parts ORh[i] and ORh[i] may hereinafter be generally characterized as entries OR[i] (where, i is an integer having a value of 0 to 15). Further, the size of each of the entries OR[i] may be implemented as 2048 bits, for example. In an embodiment of the inventive concepts, a size of OR 116 may be an integer multiple of a size of the IR 112.

Figure 5D:
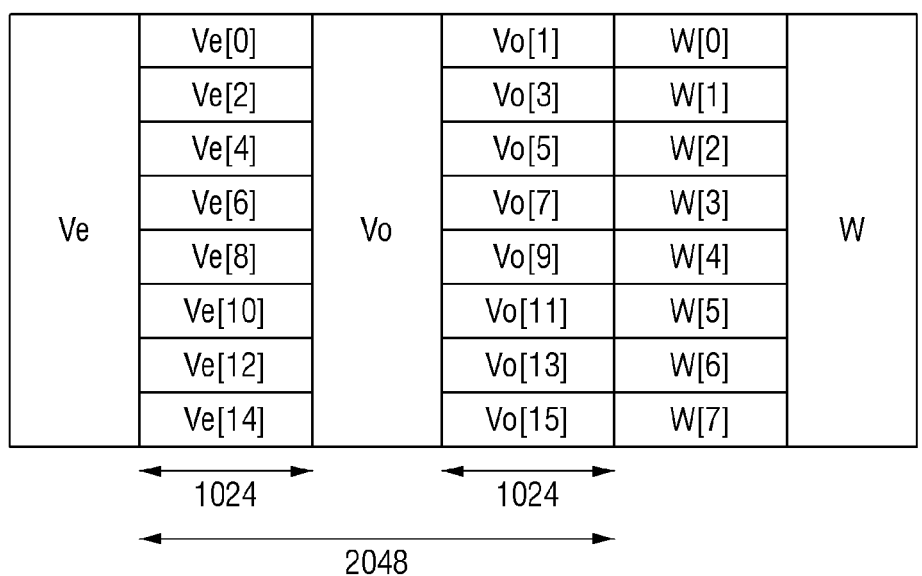

In some exemplary embodiments of the inventive concepts, the OR 116 may be used as an input register of the data arrange layer 130 shown in FIG. 4. In this case, in order to reuse the result of calculation stored in the OR 116 efficiently, each entry OR[i] of the OR 116 may be divided into an upper part ORh[i] and a lower part ORh[i]. For example, an entry OR[0] may include the upper part ORh[0] having 1024 bits and the lower part OR1[0] having 1024 bits. Such division of each entry OR[i] into the upper part ORh[i] and the lower part ORh[i] may be implemented for compatibility with a W register to be described below with reference to FIG. 5D. The W register refers to respective single entries which store the result of integrating a corresponding entry included in the register file Ve and a corresponding entry included in the register file Vo, as illustrated in FIG. 5D.

By defining the entries of the OR 116 such that the entries have the same size as each of the entries of the IR 112 and the CR 114, moving the data between the IR 112, the CR 114 and the OR 116 may be achieved more easily and more conveniently. That is, the data may be moved conveniently with efficiency because entries of the OR 116 are compatible with entries of the IR 112 and entries of the CR 114.

Among the entries, the entries OR[0] (including parts ORh[0] and OR1[0] as shown) to OR[7] (including parts ORh[7] and OR1[7] as shown) may be defined and used as the register file OSR0 for supporting image data size for various ROI calculations, as in the case of the IR 112 and the CR 114. Likewise, the entries OR[8] (including parts ORh[8] and OR1[8] as shown) to OR[15] (including parts ORh[15] and OR1[15] as shown) may be defined and used as the register file OSR1 for supporting the image data size for various ROI calculations.

However, it should be understood that the definitions of the register file OSR0 and the register file OSR1 are not limited as described with respect to FIG. 5C, but they may be grouped and defined variably according to size of processed data. That is, the register file OSR0 and the register file OSR1 may be defined to have different structure from that illustrated in FIG. 5C, in consideration of for example image data size, matrix calculation features, filter calculation features, or the like.

Further, the size of the entries for the IR 112, the CR 114 and the OR 116, and/or the number of the entries constituting the register files, are not limited to the embodiments described above, and the size and/or the number of the entries may be varied according to the specific purpose of an implementation.

The IR 112, the CR 114 and the OR 116 in FIGS. 5A to 5C are individually described based on the usage thereof. However, in some exemplary embodiments, register virtualization may be implemented so that from the perspective of the first processor 100, it may be perceived as if there exists four sets of registers having a same size.

Referring now to FIG. 5D, the vector register (VR) 214 is provided to store data for performing vector calculations at the second processor 200.

According to an embodiment, the VR 214 may be implemented to include 16 entries. For example, the 16 entries as shown in FIG. 5D may include entries Ve[0], Ve[2], Ve[4], Ve[6], Ve[8], Ve[10], Ve[12] and Ve[14] which may hereinafter be generally characterized as entries Ve[i] wherein i is an even integer between 0 and 15 (i.e., even-numbered indices), and entries Vo[1], Vo[3], Vo[5], Vo[7], Vo[9], Vo[11], Vo[13] and Vo[15] which may hereinafter be generally characterized as entries Vo[i] wherein i is an odd integer between 0 and 15 (i.e., odd-numbered indices). Further, the size of each of the entries Ve[i] and Vo[i] may be implemented as 1024 bits, for example.

According to an embodiment, 8 entries Ve[i] corresponding to even-numbered indices among the 16 entries may be defined as the register file Ve, and 8 entries Vo[i] corresponding to odd-numbered indices among the 16 entries may be defined as the register file Vo. Further, the W register may be implemented, which includes respective single entries which may hereinafter be generally characterized as entries W[i] (i is an integer having a value of 0 to 7) and which store the result of integrating a corresponding entry included in the register file Ve and a corresponding entry included in the register file Vo.

For example, one entry W[0] storing the result of integrating an entry Ve[0] and an entry Vo[1] may be defined, and one entry W[1] storing the result of integrating an entry Ve[2] and an entry Vo[3] may be defined, whereby the W register as shown including a total of 8 entries W[i] is established.

The size of the entries for the VR 214, and/or the number of the entries constituting the register file are not limited to the embodiments described above, and the size and/or the number of the entries may be varied according to the specific purpose of an implementation.

As in the case of the IR 112, the CR 114 and the OR 116 described above in FIGS. 5A to 5C, for the VR 214, register virtualization may be implemented so that, from the perspective of the first processor 100 and the second processor 200, it may be perceived as if there exists five sets of registers having a same size.

In the above case, the data stored in the virtual register may move between the IR 112, the CR 114, the OR 116 and the VR 214 through the MVs 246*a*, 246*b*, 246*c* and 246*d* illustrated in FIG. 3. Accordingly, the first processor 100 and the second processor 200 may share the data or reuse the stored data using the virtual register, rather than accessing or using a memory device (such as memory device 500 shown in FIG. 1).

Figure 6:
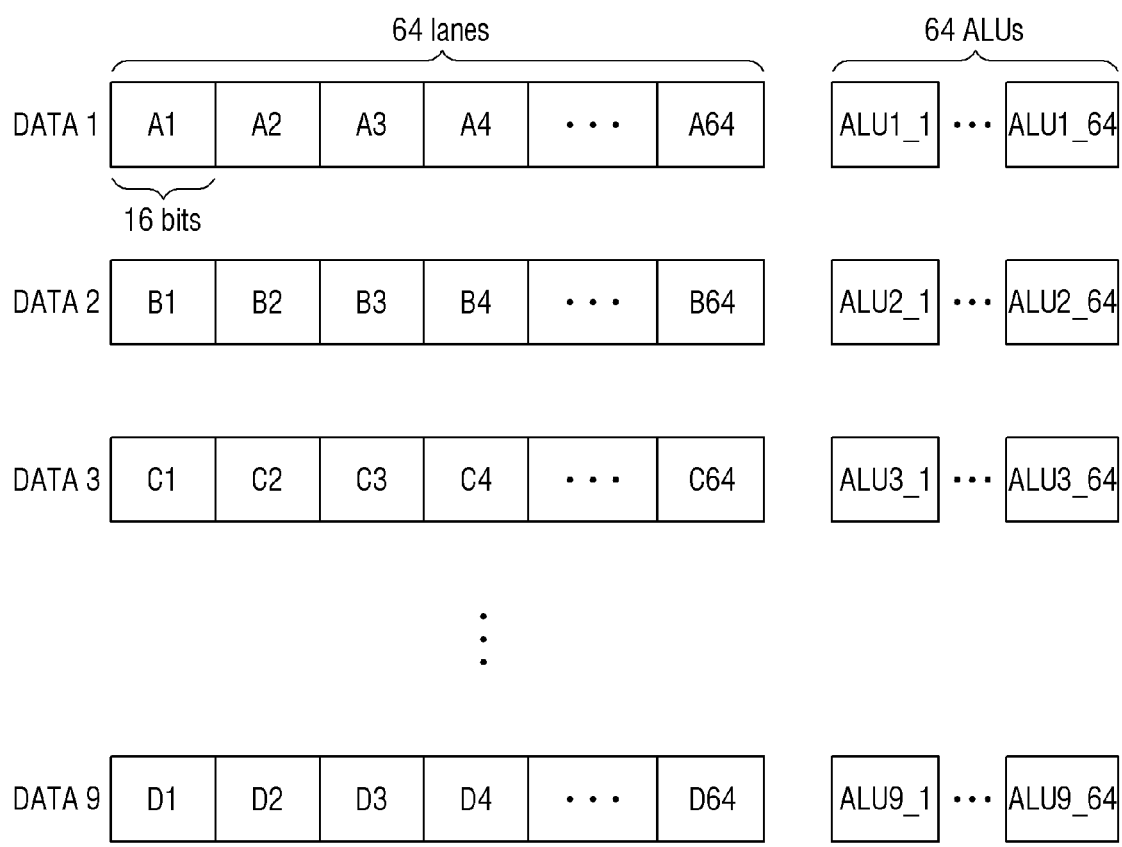
FIG. 6 illustrates a schematic view explanatory of an implementation in which data is stored in a semiconductor device according to an embodiment of the inventive concepts.

FIG. 6 illustrates a schematic view explanatory of an implementation in which data is stored in a semiconductor device according to an embodiment of the inventive concepts. Referring to FIG. 6, the data rearranged by the data arrange layer 130 may constitute 9 parallel-arranged data rows (DATA 1 to DATA 9).

Each of the data rows (DATA 1 to DATA 9) may have a plurality of lanes in a vertical direction. For example, a first element A1 of the first data row DATA 1, a first element B1 of the second data row DATA 2, a first element C1 of the third data row DATA3, . . . , and a first element D1 of the ninth data row DATA 9 may form a first lane, and a second element A2 of the first data row DATA 1, a second element B2 of the second data row DATA 2, a second element C3 of the third data row DATA3, . . . , and a second element D2 of the ninth data row DATA 9 may form a second lane. In FIG. 6, the data rearranged by the data arrange layer 130 includes 64 lanes.

According to an embodiment, the width of each lane may be 16 bits. That is, the first element A1 of the first data row DATA 1 may be stored in 16 bit data form. In this case, the first data row DATA 1 may include 64 elements A1, A2, A3, . . . , and A64 each having 16 bit data form. Similarly, the second data row DATA 2 may include 64 elements B1, B2, B3, . . . , and B64 each having 16 bit data form, the third data row DATA 3 may include 64 elements C1, C2, C3, . . . , and C64 each having 16 bit data form, . . . , and the ninth data row DATA 9 may include 64 elements D1, D2, D3, . . . , and D64 each having 16 bit data form The first processor 100 may include a plurality of ALUs for processing the data rearranged by the data arrange layer 130, and the plurality of ALUs may include 9×64 ALUs respectively corresponding to 9 data rows (DATA 1 to DATA 9). For example, the first ALU group 160*a* of FIG. 4 may correspond to the first data row DATA 1, and the second ALU group 160*b* of FIG. 4 may correspond to the second data row DATA 2. Further, the eighth ALU group 160*c* of FIG. 4 may correspond to an eighth data row DATA 8 (not shown), and the ninth ALU group 160*d* of FIG. 4 may correspond to the ninth data row DATA 9.

Further, 64 ALUs of the first ALU group 160*a* (i.e., ALU1_1 to ALU1_64) may parallel-process the data corresponding to 64 elements of the first data row DATA 1, respectively, and 64 ALUs of the second ALU group 160*b* (i.e., ALU2_1 to ALU2_64) may parallel-process the data corresponding to 64 elements of the second data row DATA 2, respectively. Further, 64 ALUs of the eighth ALU group 160*c* (i.e., ALU8_1 to ALU8_64) may parallel-process the data corresponding to 64 elements of the eighth data row DATA 8, and 64 ALUs of the ninth ALU group 160*d* may parallel-process the data corresponding to 64 elements of the ninth data row DATA 9, respectively. Therefore, in an embodiment as described with respect to FIGS. 4 and 6, the semiconductor device 1 includes N number of data rows each having M number of lanes, and N number of ALU groups respectively processing the N number of data rows, wherein the N number of ALU groups each respectively include M number of ALUs. In the embodiment of FIGS. 4 and 6, N is 9 and M is 64.

According to various embodiments, the number of data rows in the data rearranged by the data arrange layer 130 is not limited to be 9, and may be varied according to the specific purpose of an implementation. Also, the number of a plurality of ALUs respectively corresponding to a plurality of data rows may be varied according to the purpose of an implementation.

Meanwhile, as described below with reference to FIG. 8A, when the number of the data rows of the data rearranged by the data arrange layer 130 is 9, efficiency may be enhanced especially in the ROI calculations of various sizes of matrices.

Figure 7:
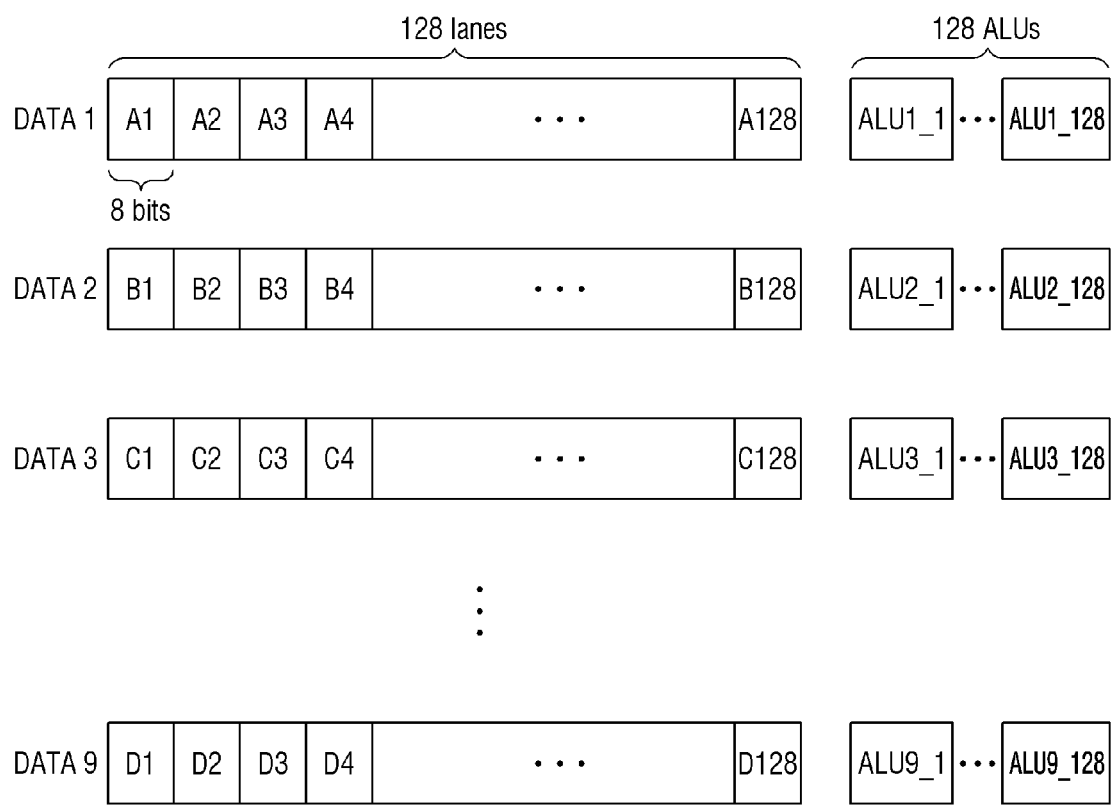
FIG. 7 illustrates a schematic view explanatory of an implementation in which data is stored in a semiconductor device according to another embodiment of the inventive concepts.

FIG. 7 illustrates a schematic view explanatory of an implementation in which data is stored in a semiconductor device according to another embodiment of the inventive concepts.

Referring to FIG. 7, the data rearranged by the data arrange layer 130 may constitute 9 parallel-arranged data rows (DATA 1 to DATA 9).

In referring to FIG. 7, only the differences between the implementation of FIG. 6 and the implementation of FIG. 7 are described. In FIG. 7 each of the data rows (DATA 1 to DATA 9) may have a plurality of lanes in a vertical direction and the width of each lane may be 8 bits according to an embodiment. That is, the first element Al of the first data row DATA 1 may be stored in an 8 bit data form. In this case, the first data row DATA 1 may include 128 elements each having an 8 bit data form.

The first processor 100 may include a plurality of ALUs for processing the data rearranged by the data arrange layer 130, and a plurality of ALUs may include 9×128 ALUs respectively corresponding to 9 data rows (DATA 1 to DATA 9).

According to various embodiments, the number of data rows in the data rearranged by the data arrange layer 130 is not limited to be 9, and may be varied according to the specific purpose of an implementation. Also, the number of a plurality of ALUs respectively corresponding to a plurality of data rows may be varied according to the specific purpose of an implementation.

As described below with reference to FIG. 8A, when the number of the data rows of the data rearranged by the data arrange layer 130 is 9, efficiency may be enhanced especially in ROI calculations of matrices of various sizes.

Figure 8C:
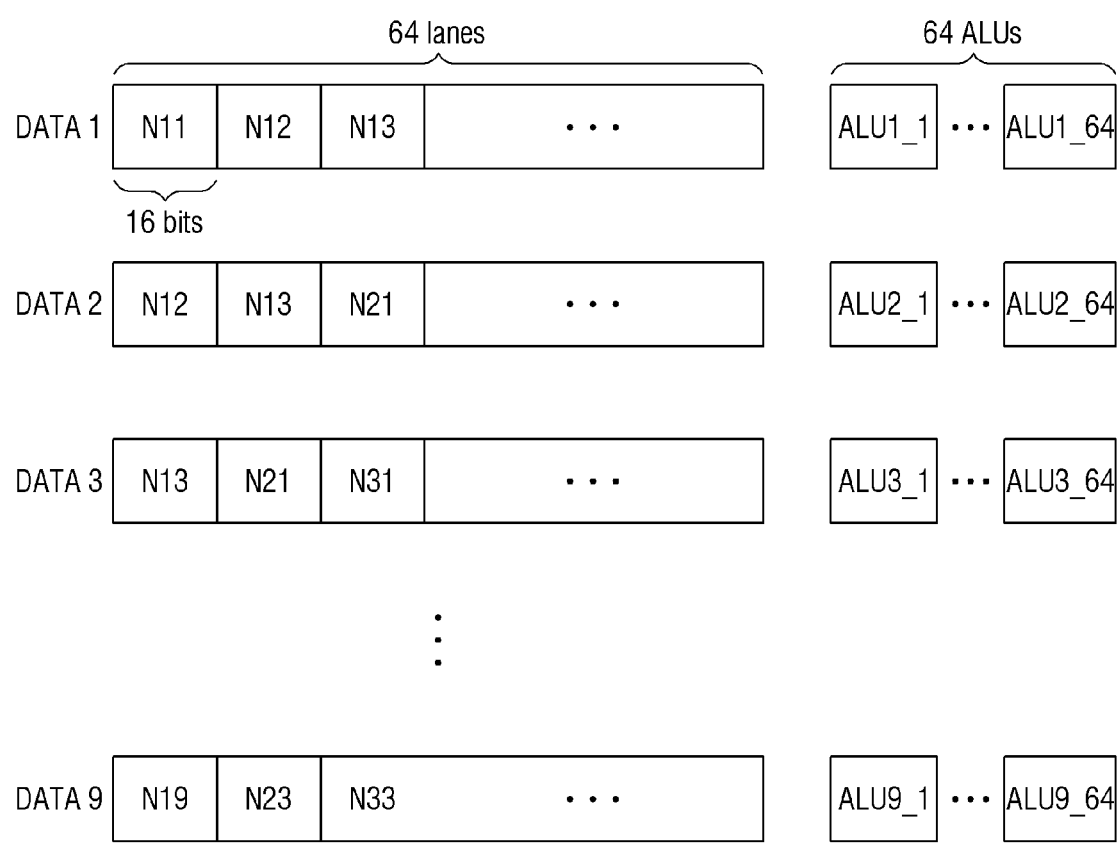

FIG. 8A illustrates a schematic view provided explanatory of data patterns for ROI calculations with respect to matrices of various sizes, FIGS. 8B and 8C illustrate schematic views explanatory of data patterns for ROI calculations according to an embodiment of the inventive concepts, and FIGS. 8D, 8E, 8F and 8G illustrate schematic views explanatory of data patterns for ROI calculations according to another embodiment of the inventive concept. Referring to FIGS. 8A to 8G, the patterns of using the data rearranged by the data arrange layer 130 may be determined according to a matrix size most frequently used in applications associated with image processing, vision processing, and neural network processing.

Referring to FIG. 8A, matrix M1 includes image data that is required for an image size 3×3 to be executed by ROI calculations, and matrix M2 includes image data that is required for an image size 4×4 to be executed by ROI calculations. Matrix M3 includes image data required for an image size 5×5 to be executed by ROI calculations, matrix M4 includes image data required for an image size 7×7 to be executed by ROI calculations, and matrix M5 includes image data required for an image size 8×8 to be executed by ROI calculations. Likewise, matrix M6 includes image data required for an image size 9×9 to be executed by ROI calculations, and matrix M7 includes image data required for an image size 11×11 to be executed by ROI calculations. For example, it is assumed that the image data illustrated in FIG. 8A is stored in a memory device (such as memory device 500 shown in FIG. 1). As illustrated in FIG. 8B, when ROI calculations are executed for 3×3 size matrices (e.g., M11, M12 and M13), the first processor 100 may read the image data of FIG. 8A stored in the memory device and store it in the IR 112.

In this case, referring to FIG. 8C, image data (N11 to N19) corresponding to the matrix M11 may be arranged at a first lane in a vertical direction of the 9 parallel-arranged data rows (DATA 1 to DATA 9). Next, image data N12, N13, N21, N15, N16, N22, N18, N19 and N23 corresponding to the matrix M12 may be arranged at a second lane. Next, image data N13, N21, N31, N16, N22, N32, N19, N23 and N33 corresponding to the matrix M13 may be arranged at a third lane.

Accordingly, a plurality of ALUs (ALU1_1 to ALU9_1) such as shown in FIG. 4 may perform ROI calculations on the first lane including the image data corresponding to the matrix M11, and a plurality of ALUs (ALU1_2 to ALU9_2) may perform an ROI calculation on the second lane including the image data corresponding to the matrix M12. Further, a plurality of ALUs (ALU1_3 to ALU9_3) may perform an ROI calculation on the third lane including the image data corresponding to the matrix M13.

As the image data is processed as described in the above embodiment, when it is assumed that the matrix to be executed by the ROI calculations has 3×3 size, the first processor 100 may perform matrix calculation with respect to three image lines per one cycle. In this example, use of a plurality of ALUs for the parallel-processing of 9 data rows (DATA 1 to DATA 9) provides 100% efficiency.

As illustrated in FIG. 8D, when ROI calculations are executed for 5×5 size matrices (e.g., M31 and M32), the first processor 100 may read the image data of FIG. 8A stored in the memory device and store it in the IR 112.

Figure 8E:
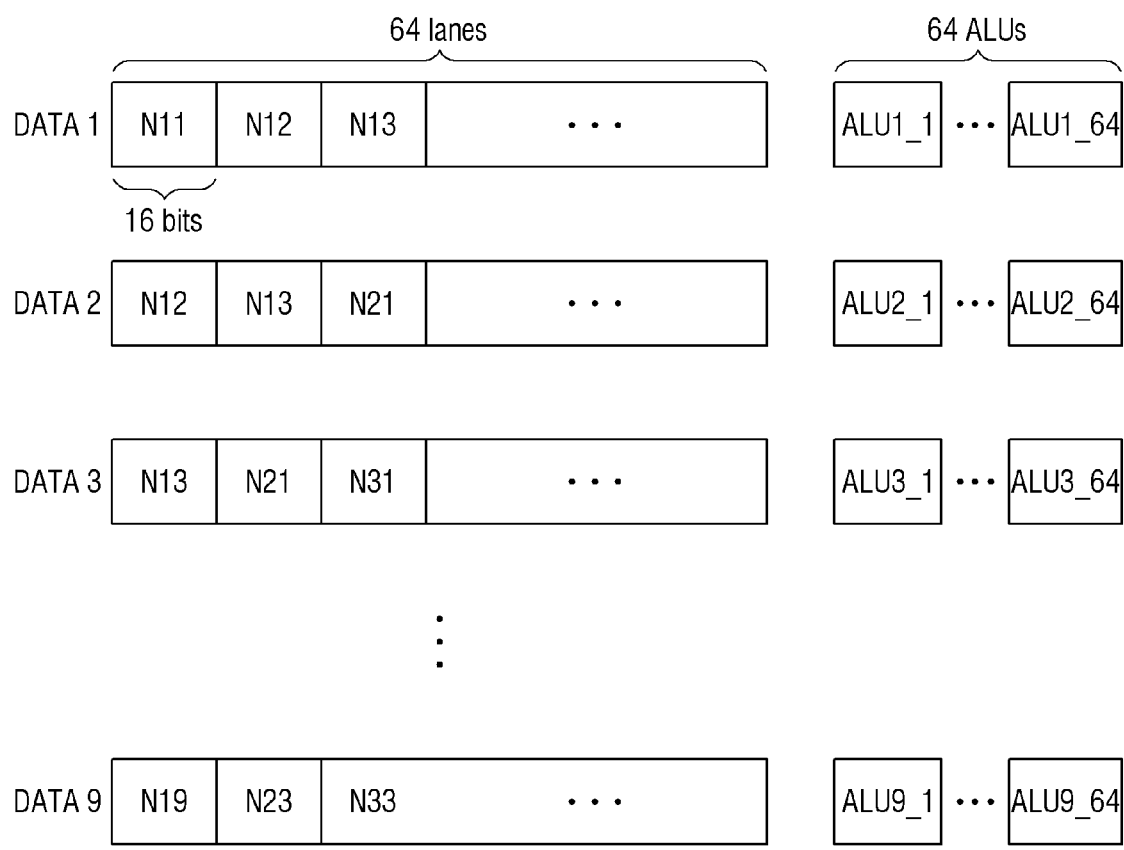
Figure 8F:
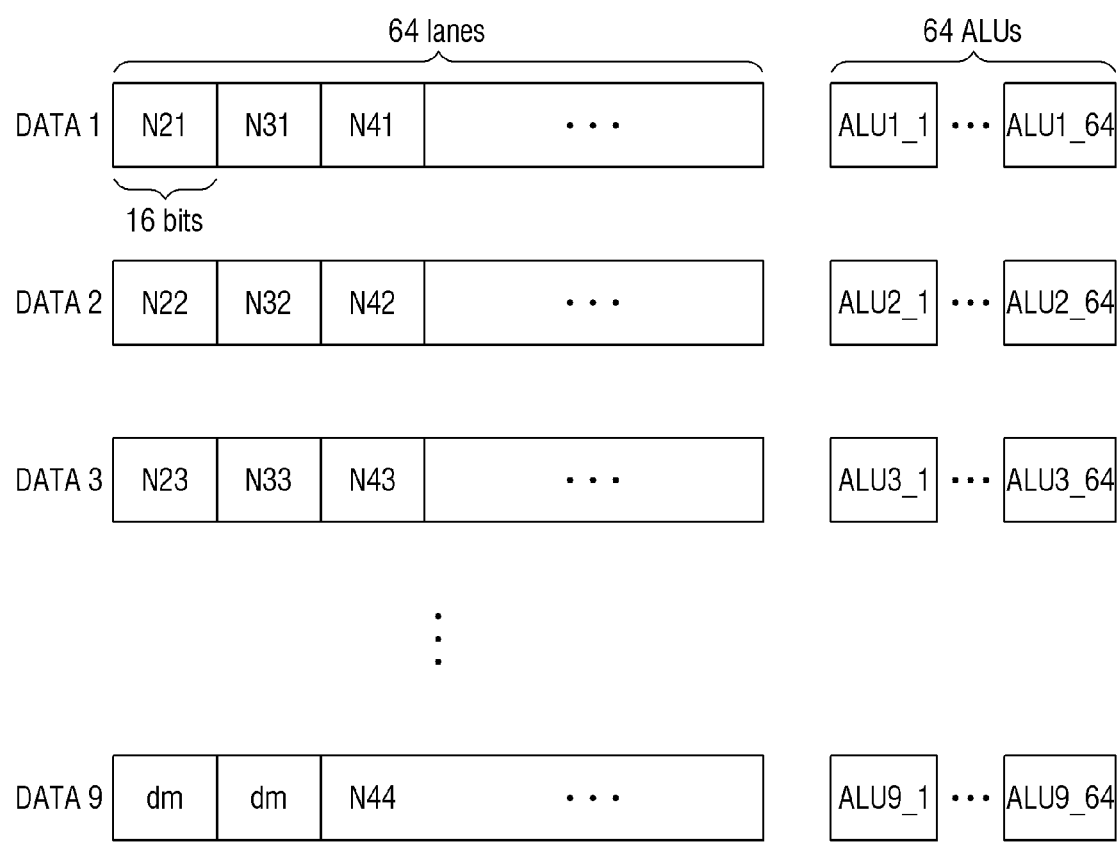
Figure 8G:
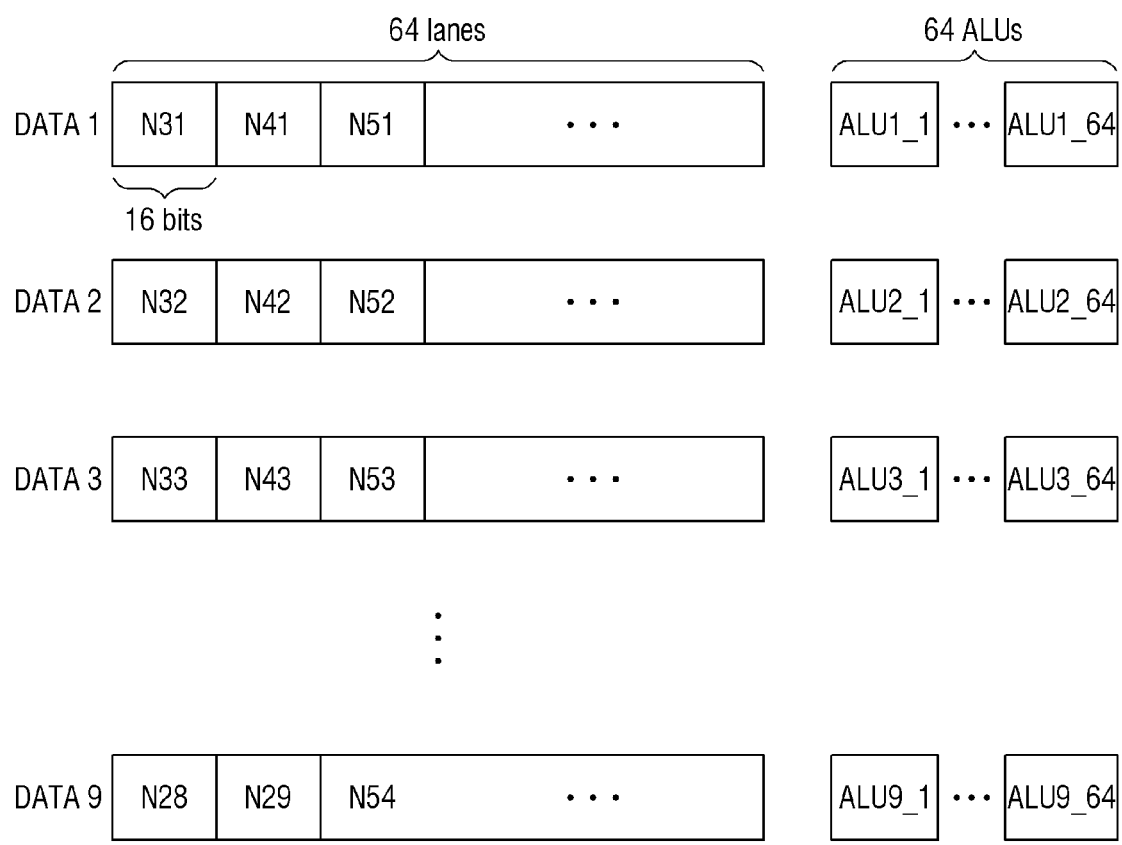

In this case, referring to FIGS. 8E, 8F and 8G, 5×5 matrix calculation is performed for three cycles in total. During a first cycle as shown in FIG. 8E, calculation is performed with the same method used for a 3×3 matrix as described with respect to FIGS. 8B and 8C. During a second cycle as shown in FIG. 8F, the image data (N21, N22, N23, N27, N26, N25 and N24) in the matrix M2 of FIG. 8A excluding the image data for the matrix M1 of FIG. 8A, are allocated to the ALUs (ALU1_1 to ALU9_1) or to the first vector lane, and the data of the image data N31, N32, N33, N34, N27, N26 and N25 are allocated to the ALUs (ALU1_2 to ALU9_2) or to the second vector lane. Data are continuously allocated to the lanes using the same method during the second cycle. During a third cycle as shown in FIG. 8G, the image data (N31, N32, N33, N34, N37, N36, N35, N29 and N28) in the matrix M3 excluding the image data for the matrix M2 are allocated to the ALUs (ALU1_1 to ALU9_1) or to the first vector lane, and allocation and processing continues in the same manner for the subsequent lanes.

As the image data are processed in the manner described according to the above embodiment, when it is assumed that the matrix to be executed by ROI calculations has 5×5 size, the first processor 100 skips the calculation for only the two data (as indicated by the entries dm in FIG. 8F) during the second cycle, and accordingly, 93% efficiency of using the ALUs is achieved ((64 lanes×9 columns×3 cycles−64 lanes×2 columns)×100/64×9×3).

In the same context, when it is assumed that the matrix to be executed by ROI calculation has 4×4 size, the first processor 100 performs the matrix calculation over two cycles, while skipping the calculation for only two data, in which case 89% efficiency of using the ALUs is achieved.

When it is assumed that the matrix to be executed by an ROI calculation has 7×7 size, the first processor 100 performs the matrix calculation over six cycles, while skipping the calculation for only five data, in which case 91% efficiency of using the ALUs is achieved.

When it is assumed that the matrix to be executed by an ROI calculation has 8×8 size, the first processor 100 performs the matrix calculation over eight cycles, while skipping the calculation for only eight data, in which case 89% efficiency of using the ALUs is achieved.

When it is assumed that the matrix to be executed by an ROI calculation has 9×9 size, the first processor 100 performs 9×9 matrix calculation over the nine cycles for nine image lines, while using all the data, in which case 100% efficiency of using the ALUs is achieved.

When it is assumed that the matrix to be executed by an ROI calculation has 11×11 size, the first processor 100 performs the matrix calculation over the 14 cycles, while skipping the calculation for only eight data from the 11 image lines, in which case 96% efficiency of using the ALUs is achieved.

As described above with reference to FIGS. 8A to 8G, when the number of the data rows of the data rearranged by the data arrange layer 130 is 9, 90% efficiency of using ALUs of the first processor 100 can be maintained, when performing the ROI calculation with respect to various sizes of the matrix including 3×3, 4×4, 5×5, 7×7, 8×8, 9×9, 11×11 sizes which are most frequently used matrix sizes in applications associated with image processing, vision processing and neural network processing.

In some exemplary embodiments, when a size of the calculated matrix increases, data arrangement is performed only on a portion which is increased from the previous matrix size. For example, to perform a second calculation for the matrix M2 shown in FIG. 8A, after performing a first calculation for the matrix M1, additional data arrangement may be performed only with respect to the image data (N21, N22, N23, N27, N26, N25 and N24) required for the second calculation.

In some exemplary embodiments, a plurality of ALUs may perform the calculation using the image data stored in the IR 112 and filter coefficients stored in the CR 114, and store a result in the OR 116.

FIG. 8H illustrates a schematic view explanatory of a shiftup calculation of a semiconductor device according to an embodiment of the inventive concepts.

Referring to FIG. 8H, a shiftup calculation performed by the semiconductor device according to an embodiment of the inventive concepts may control a method for reading the data stored in the IR 112 in order to efficiently process the image data previously stored in the IR 112 from the memory device.

To specifically explain the shiftup calculation, when ROI calculations are necessary for 5×5 matrices M31 and M32 such as shown in FIG. 8D, all the image data corresponding to the first region R1 of FIG. 8H may have already been processed, and when it becomes necessary to process the image data corresponding to the second region R2 of FIG. 8H, only the sixth line of data (i.e., image data N38, N39, N46, N47, N48, N49, N56, N76, N96, NA6 and NB6) which are additionally required are read from the memory to the IR 112.

For example, when the data of the first to fifth lines corresponding to the first region R1 are respectively stored in the IR[0] to the IR[4] of FIG. 5A, the data of the sixth line may be stored in the IR[5] in advance. By doing so, the ROI calculations may be continuously performed for the 5×5 matrices M31 and M32 with respect to the second to sixth lines only by adjusting the read region of the IR 112 to the second region R2 while avoiding additional memory access.

FIG. 9 illustrates a flowchart explanatory of an exemplary operation in which Harris corner detection is performed using a semiconductor device according to various embodiments of the inventive concept. Harris corner detection should be understood as well known to a person skilled in the art, and therefore will not be specifically explained here.

Referring to FIG. 9, an embodiment of the Harris corner detection includes inputting an image, at S901. For example, an image for corner detection is input (e.g., from a memory device such as memory device 500 shown in FIG. 1) to the first processor 100 via the memory bus 400 of FIG. 1.

At S903, a derivative value DV is calculated. For example, the first processor 100 may calculate a derivative value DV with respect to pixels along X and Y axes, for example, from the image data rearranged by the data arrange layer 130, according to need. In this example, derivatives may be easily obtained by applying a one-dimensional filter such as a Sobel filter, by multiplying each image by a derivative coefficient in the x axis direction (Ix=Gx*I) and the y axis direction (Iy=Gy*I). The inputted images are stored in the IR 112, the derivative coefficients (Gx and Gy) are stored in the CR 114, and the results of multiplication (Ix and Iy) are stored in the OR 116.

Next, at S905, the derivative product DP is calculated. For example, according to need, the first processor 100 may calculate the derivative product DP with respect to every pixel from the derivative values DV rearranged by the data arrange layer 130. Based on a result of S903, the x axis and y axis results (i.e., derivative values) are squared ($Ix^2$, $Iy^2$), and the x axis and y axis squared results are multiplied by each other ($Ixy=Ix^2*Iy^2$), thus providing the DP value. In this example, by reusing the results of S903 stored in the OR 116, the x axis and y axis results of calculations are used as the vector ALU inputs using the IDA 192/CDA 194 pattern of the OR 116, and the result of the calculation is stored again in the OR 116.

Next, at S907, the sum of squared difference (SSD) is calculated. For example, the first processor 100 calculates the SSD using the derivative product DP. Similar to the operation at S905, the SSD calculation ($Sx^2=Gx*Ix^2$, $Sy^2=Gy*Iy^2$, $Sxy=Gxy*Ix*Iy$) also processes the data stored in OR 116 as the result of the operation in S905 and the IDA 192 allocates the data to the vector functional units (VFUs) 244a, 244b and 244c such as shown in FIG. 3, multiplies the derivative coefficient stored in the CR 114, and stores the result in the OR 116 again.

At S909, the key point matrix is defined. Incidentally, because determining the key point matrix is difficult to perform with only the first processor 100 specialized for the ROI processing, it may be performed through the second processor 200. That is, the second processor 200 defines the key point matrix.

In this case, resultant values stored in the OR 116 of the first processor 100 may be shared with the second processor 200 and reused. For example, resultant values stored in the OR 116 of the first processor 100 may be moved to the VR 214 of the second processor 200 using the MVs 246a, 246b, 246c and 246d of FIG. 3. Alternatively, the vector functional units (VFUs) 244a, 244b and 244c that can be directly inputted with the values of the OR 116 may use the result at the first processor 100, without going through the MVs 246a, 246b, 246c and 246d.

Next, at S911, a response function (R=Det(H)−k(Trace $(H)^2$)) is calculated. For example, the second processor 200 calculates a response function using resultant values of S909 stored in the VR 214. At this stage, because only the second processor 200 is used, intermediate and final results of all the calculations are stored in the VR 214.

Next, at S913, a key point is detected by performing a non maximum suppression (NMS) calculation. The operation at S913 may be processed by the first processor 100 again.

In this case, resultant values stored in the VR 214 of the first processor 200 may be shared with the first processor 100 and reused. For example, resultant values stored in the VR 214 of the second processor 200 may be moved to the OR 116 of the first processor 100 using the MVs 246a, 246b, 246c and 246d of FIG. 3. Alternatively, the resultant values may be allocated to the VFUs 244a, 244b and 244c from the VR 214 directly through the IDA 192/CDA 194.

Since only the registers of the first processor 100 (i.e., IR 112, CR 114 and OR116) and the registers of the second processor 200 (i.e., SR 212 and VR 214) are used until the corner detection work of the input image is finished in the manner described above, there is no need to access the memory device. Accordingly, cost such as overhead and power consumption expended in accessing the memory device may be considerably reduced.

FIG. 10 illustrates a view explanatory of an implementation of instructions for efficiently processing matrix calculations used in an application associated with vision processing and neural network processing, supported by a semiconductor device according to an embodiment of the inventive concept.

Referring to FIG. 10, the first processor 100 supports instructions for efficiently processing matrix calculations used in applications associated with vision processing and neural network processing. The instructions may be divided mainly into three types of instructions (or stages).

The MAP instructions are instructions for calculating data using a plurality of ALUs 160, for example, and support calculations identified by opcodes such as Add, Sub, Abs, AbsDiff, Cmp, Mul, Sqr, or the like. The MAP instructions have the OR 116 of the first processor 100 as a target register, and use the data pattern generated from at least one of the IDA 192 and the CDA 194 as an operand. Further, a field may be additionally (optionally) included, indicating whether a unit of the processed data is 8 bits or 16 bits.

The REDUCE instructions are instructions for tree calculation, for example, and support calculations identified by opcodes such as Add tree, minimum tree, maximum tree, or the like. The REDUCE instructions have at least one of the OR 116 of the first processor 100 and the VR 214 of the second processor 200 as a target register, and use the data pattern generated from at least one of the IDA 192 and the CDA 194. Further, a field may be additionally included, indicating whether a unit of the processed data is 8 bits or 16 bits.

MAP_REDUCE instructions are instructions combining the map calculation and the reduce calculation. MAP_RE- DUCE instructions have at least one of the OR 116 of the first processor 100 and the VR 214 of the second processor 200 as a target register, and use the data pattern generated from at least one of the IDA 192 and the CDA 194. Further, a field may be additionally included, indicating whether a unit of the processed data is 8 bits or 16 bits.

According to the various embodiments described above, the first processor 100 and the second processor 200 share the same ISA so that the first processor 100 specialized for ROI calculations and the second processor 200 specialized for arithmetic calculations are shared at an instruction level, thus facilitating control. Further, by sharing the registers, the first processor 100 and the second processor 200 may increase data utilization and decrease the number of memory access. Further, by using data patterns for efficiently performing the ROI calculations with respect to various sizes of data (e.g., matrix) for processing at the first processor 100, efficient processing may be possibly performed specifically with respect to 3×3, 4×4, 5×5, 7×7, 8×8, 9×9, 11×11 matrices which are frequently used matrix sizes in image processing, vision processing and neural network processing.

FIGS. 11A and 11B illustrates views explanatory of an example of actual assembly instructions for convolution calculation of a 5×5 matrix in FIG. 8D.

Referring to FIGS. 10 and 11A, in MAPMUL_ReduceAcc16(IDA_Conv3(IR), CDA_Conv3(CR, w16)) instructions at a first line (i.e., a first assembly instruction), MAPMUL_ReduceAcc16 indicates instructions to be performed at MAP stage and reduce stage according to stage, target register, operator 1, operator 2 and Opcode of FIG. 10. Accordingly, with respect to 16 bit data, Mul instructions are performed at the MAP stage and add tree is performed at the reduce stage, in which Acc instructions are used because the previous result of addition is accumulated. An operator, ".", of each line is an operator for distinguishing instructions to be processed in each of the slots 240a, 240b, 240c and 240d of the first processor 100 and the second processor 200. Accordingly, calculating operations are performed in the first processor 100 and the second processor 200 using instruction sets of SIMD and multi slot VLIW structures. For example, MAPMul_ReducedAcc16 is allocated to the slot where the first processor 100 is positioned and the ShUpReg=1 instruction is allocated to the slot corresponding to the second processor 200. The instructions 'ShUpReg' is a shiftup register instruction for changing a register data region (register window) used in a calculation, as described above in FIG. 8F, and may be implemented to be performed by the first processor 100 or the second processor 200. The other instructions except for MAPMul_ReducedAcc16 may be performed in the slot corresponding to the second processor 200, but are not be limited hereto. Depending on methods of implementation, the other instructions may be performed also in the first processor 100.

In this example, an input value is received from a virtual register, IDA_Conv3(IR) and CDA_Conv3(CR, w16). Conv3 indicates that the data pattern of 3×3 matrix (i.e., n×n matrix) in FIG. 8B is inputted from the IR 112 and the CR 114. When the first assembly instruction is performed, the data of the matrix M11 of FIG. 8B is stored at a first lane, the data of the matrix M12 is stored at a second lane, the data of the matrix M13 is stored at a third lane, and the other corresponding data are likewise stored in the following lanes.

The second assembly instruction, MAPMul_reduceAcc16(IDA_Conv4(IR), CDA_Conv4(CR, w16)), is calculated with the same method while varying only the input data pattern. In this example, as described above with respect to the 5×5 matrix calculation, the rest of the data of the 4×4 matrix (i.e., (n+1)×(n+1) matrix) other than data of the 3×3 matrix (e.g., image data of the region of D2 region excluding D1 region in FIG. 11B) are inputted to each lane of the VFUs, and a corresponding result is stored in the OR 116 together with the 3×3 result according to the add tree. Such result indicates a result of convolution calculation with respect to 4×4 size.

The final MAPMUL_ReduceAcc16(IDA_Conv5(IR), CDA_Conv5(CR, w16)) performs the same calculation as the previous calculation with respect to the rest of the data of the 5×5 matrix other than data of the 4×4 matrix.

When these three instructions are performed, a result of the convolution filter is stored in the OR 116 with respect to the 5×5 matrix of the inputted 5 rows. Later when the calculation window goes down for one line and begins the 5×5 matrix calculation corresponding to the first to fifth rows again, only the fifth row is newly inputted for this purpose, while the previously-used first to fourth rows are reused with the register shiftup instruction as described above with reference to FIG. 8H.

According to an embodiment, data once inputted will not be read again from the memory device so that the frequency of accessing the memory device can be reduced, and performance and power efficiency can be maximized.

Figure 12:
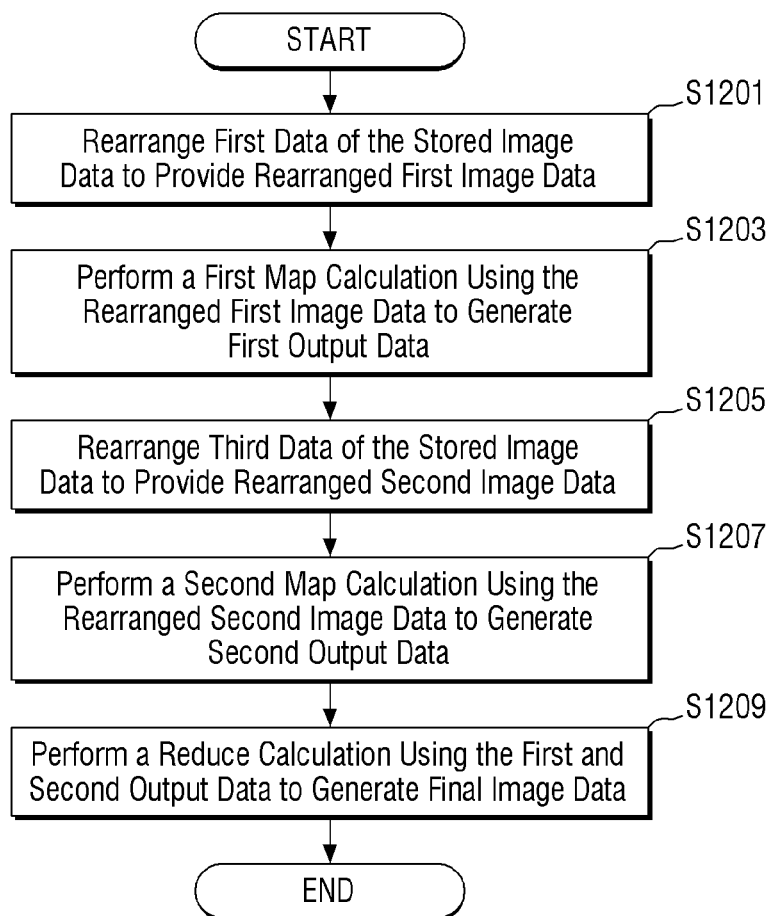
FIG. 12 illustrates a flowchart explanatory of an exemplary region of interest (ROI) calculation using a semiconductor device according to an embodiment of the inventive concepts.

FIG. 12 illustrates a flowchart explanatory of an exemplary region of interest (ROI) calculation using a semiconductor device according to an embodiment of the inventive concepts.

The ROI calculation may be performed using a semiconductor device such as semiconductor device 1 described with respect to FIGS. 1-5D, in accordance with features further described with respect FIGS. 6-8H, 10, 11A and 11B. The semiconductor device in this embodiment may include the internal register 110 configured to store image data provided from the memory device 500; the data arrange layer 130 configured to rearrange the stored image data into N number of data rows each having a plurality of lanes; and the plurality of arithmetic logic units (ALUs) 160 arranged into N ALU groups 160a, 160b, 160c and 160d configured to process the N number of data rows.

Referring to FIG. 12, at S1201 the data arrange layer 130 is configured to rearrange first data of the stored image data in the internal register 110 to provide rearranged first image data. The first data may have n×n matrix size wherein n is a natural number. For example, the first data may be a 3×3 matrix, and may for example correspond to the image data of the D1 region of FIG. 11B.

At S1203 of FIG. 12, the ALUs 160 are configured to perform a first map calculation using the rearranged first image data to generate first output data.

At S1205 of FIG. 12, the data arrange layer 130 is configured to rearrange third data of the stored image data in the internal register 110 to provide rearranged second image data. Here, the third data and the first data are included as parts of second data of the stored image data in the internal register 110. For example, the second data may have (n+1)×(n+1) matrix size. For example, the second data may be a 4×4 matrix including data entries N11, N12, N13, N21, N14, N15, N16, N22, N17, N18, N19, N23, N24, N25, N26 and N27 shown in FIG. 11B. In this example, the third data may correspond to data entries N21, N22, N23, N27, N26, N25 and N24 of the D2 region of FIG. 11B. Of further note with respect to this example, the third data of the D2 region does not belong to the first data of the D1 region. That is, the third data of the D2 region are not included in the 3×3 matrix consisting of the first data of the D1 region shown in FIG. 11B.

At S1207 of FIG. 12, the ALUs 160 are configured to perform a second map calculation using the rearranged second image data to generate second output data.

At S1209 of FIG. 12, the ALUs 160 are configured to perform a reduce calculation using the first and second output data to generate final image data.

While the present inventive concepts have been particularly shown and described with reference to exemplary embodiments thereof, it will be understood by those of ordinary skill in the art that various changes in form and details may be made therein without departing from the spirit and scope of the present inventive concepts as defined by the following claims. It is therefore desired that the present embodiments be considered in all respects as illustrative and not restrictive, reference being made to the appended claims rather than the foregoing description to indicate the scope of the inventive concepts.

What is claimed is:

1. An image processing method of a semiconductor device, wherein the semiconductor device comprises an internal register configured to store image data, a data arrange layer configured to rearrange the stored image data into N number of data rows each having a plurality of lanes, and a plurality of arithmetic logic units (ALUs) comprising N ALU groups configured to process the N number of data rows, the method comprising:
    rearranging, by the data arrange layer, first data of the stored image data to provide rearranged first image data, the first data having an n×n matrix size wherein n is a natural number; and
    performing, by the ALUs, a first map calculation using the rearranged first image data to generate first output data.

2. The image processing method of claim 1, wherein the first map calculation is processed by the ALUs in parallel.

3. The image processing method of claim 1, wherein N is 9.

4. The image processing method of claim 3, wherein n is 3.

5. The image processing method of claim 1, the method further comprising:
    rearranging, by the data arrange layer, third data of the stored image data to provide rearranged second image data, the third data and the first data included as parts of second data of the stored image data, the second data having an (n+1)×(n+1) matrix size, and the third data not belonging to the first data; and
    performing, by the ALUs, a second map calculation using the rearranged second image data to generate second output data.

6. The image processing method of claim 5, the method further comprising:
    performing, by the ALUs, a reduce calculation using the first and second output data to generate final image data.

7. The image processing method of claim 6, wherein the first and second map calculations and the reduce calculation are processed by the ALUs in parallel.

8. The image processing method of claim 1, wherein the plurality of lanes each have size of 8 bits or 16 bits.

9. The image processing method of claim 1, wherein the internal register includes an image register (IR) storing a first image data larger than the first data.

10. The image processing method of claim 9, wherein the image register (IR) stores a (n+1)th line data of the image data for a shiftup calculation.

11. The image processing method of claim 1, wherein the image processing includes a region of interest (ROI) calculation.

* * * * *